(12) United States Patent
Harrington et al.

(10) Patent No.: US 11,920,647 B2
(45) Date of Patent: Mar. 5, 2024

(54) DISC BRAKE ROTOR ASSEMBLY

(71) Applicant: Consolidated Metco, Inc., Vancouver, WA (US)

(72) Inventors: Jonathan David Harrington, Camas, WA (US); Jared Wiley Richard Burris, Vancouver, WA (US); William Joseph Edwards, Portland, OR (US); Darren Kirk Johnson, Camas, WA (US); Pavan Kumar Dunna, Camas, WA (US); Jeffrey Adam Ricks, Brush Prairie, WA (US)

(73) Assignee: Consolidated Metco, Inc., Vancouver, WA (US)

( * ) Notice: Subject to any disclaimer, the term of this patent is extended or adjusted under 35 U.S.C. 154(b) by 367 days.

(21) Appl. No.: 17/228,289

(22) Filed: Apr. 12, 2021

(65) Prior Publication Data
US 2021/0317886 A1    Oct. 14, 2021

Related U.S. Application Data

(60) Provisional application No. 63/009,142, filed on Apr. 13, 2020.

(51) Int. Cl.
*F16D 65/12*      (2006.01)
*F16D 65/02*      (2006.01)

(52) U.S. Cl.
CPC .... *F16D 65/123* (2013.01); *F16D 2065/1364* (2013.01); *F16D 2065/1384* (2013.01)

(58) Field of Classification Search
CPC ........... F16D 65/12; F16D 65/123–128; F16D 2065/1364; F16D 2065/1384

USPC .......................................... 188/18 A, 218 XL
See application file for complete search history.

(56) References Cited

U.S. PATENT DOCUMENTS

| | | | |
|---|---|---|---|
| 5,634,535 | A  | 6/1997  | Fennell |
| 6,446,765 | B1 | 9/2002  | Dabertrand |
| 6,978,866 | B2 | 12/2005 | Niebling |
| 7,163,091 | B2 | 1/2007  | Shamine |

(Continued)

FOREIGN PATENT DOCUMENTS

| | | |
|---|---|---|
| CN | 1467128 A   | 1/2004 |
| CN | 101213387 A | 7/2008 |

(Continued)

OTHER PUBLICATIONS

PCT Search Report and Written Opinion from International Application No. PCT/US2021/026990; dated Jul. 14, 2021; 17 pages.

(Continued)

*Primary Examiner* — Christopher P Schwartz
(74) *Attorney, Agent, or Firm* — Fitch, Even, Tabin & Flannery LLP

(57) ABSTRACT

In one aspect of the present disclosure, a disc brake rotor assembly is provided that includes a disc brake rotor and a wheel hub. One of the disc brake rotor and the wheel hub includes a plurality of pairs of partial keyways and the other of the disc brake rotor and the wheel hub includes intermediate partial keyways configured to fit intermediate the pairs of partial keyways to form keyways. The disc brake rotor assembly further includes a plurality of fasteners configured to be received in the keyways to secure the disc brake rotor and the wheel hub together.

46 Claims, 14 Drawing Sheets

(56) References Cited

U.S. PATENT DOCUMENTS

| | | | |
|---|---|---|---|
| 7,934,777 B1 | 5/2011 | Yuhas | |
| 8,061,785 B2 | 11/2011 | Ilg | |
| 8,950,556 B2 | 2/2015 | Root | |
| 10,495,162 B2* | 12/2019 | Burris | B60B 27/0052 |
| 10,527,115 B2 | 1/2020 | Edwards | |
| 2001/0032761 A1 | 10/2001 | Ruiz | |
| 2002/0000355 A1 | 1/2002 | Hattori | |
| 2004/0226786 A1 | 11/2004 | Shamine | |
| 2009/0218878 A1 | 9/2009 | Lippis | |
| 2011/0062772 A1 | 3/2011 | White | |
| 2016/0025165 A1 | 1/2016 | Plantan | |
| 2016/0298706 A1 | 10/2016 | Rau, III | |
| 2017/0009828 A1 | 1/2017 | Sabeti | |
| 2017/0074335 A1 | 3/2017 | Wagner | |
| 2019/0078632 A1* | 3/2019 | Burris | B60B 27/042 |

FOREIGN PATENT DOCUMENTS

| | | |
|---|---|---|
| CN | 102414469 A | 4/2012 |
| CN | 104340317 A | 2/2015 |
| DE | 1945934 | 3/1971 |
| DE | 3436729 | 4/1986 |
| DE | 102007056748 | 5/2009 |
| DE | 102014002324 A1 | 8/2014 |
| EP | 0096553 | 12/1983 |
| GB | 983548 | 2/1965 |
| GB | 2104985 A | 3/1983 |
| WO | 03062662 | 7/2003 |
| WO | 2005038282 A1 | 4/2005 |

OTHER PUBLICATIONS

SPIROL® Coiled Spring Pins; product brochure from SPIROL International Corporation; Feb. 2018; 24 pages.

Xu, Chuanlai et al.; Influence of Brake Disc and Bolt Pretightening Force on Fatigue Strength of Wheel; Modern Manufacturing Engineering; 2015, Issue 1; 5 pages.

* cited by examiner

DISC BRAKE ROTOR ASSEMBLY

CROSS-REFERENCE TO RELATED APPLICATION

This application claims the benefit of U.S. Provisional Patent App. No. 63/009,142 filed Apr. 13, 2020, which is hereby incorporated by reference herein in its entirety.

FIELD

This disclosure relates generally to a disc brake rotor assembly, and more particularly, to a disc brake rotor assembly including a wheel hub and a disc brake rotor.

BACKGROUND

Disc brake rotors are known for their use in braking systems to slow down or stop commercial vehicles. Such disc brake rotors are typically made of cast iron and are mounted to wheel hubs which are typically made of ductile iron or aluminum. During a braking operation, a braking force is applied to the disc brake rotor which in turn translates rotational torque to the wheel hub of the vehicle to reduce the vehicle speed.

Some commercially available disc brake assemblies rely on either friction or mechanical interference to secure the disc brake rotor to the wheel hub. For example, friction constrained disc brake assemblies may utilize multiple fasteners to clamp the disc brake rotor to the wheel hub. With sufficient clamping force in the joint between the disc brake rotor and wheel hub, the rotor may withstand braking torque without slipping on the mating plane between the rotor and wheel hub. In a clamped joint, friction prevents rotor rotation relative to the wheel hub and fastener tension prevents axial displacement of the rotor relative to the wheel hub. However, over time, the clamping force applied to the rotor may be lost (e.g., as caused by nuts backing off of fasteners, or fasteners backing out of threads in the wheel hub) which may lead to problematic joint relaxation between the rotor and the wheel hub.

In contrast, mechanical interference joints typically utilize a splined connection between the disc brake rotor and the wheel hub. In a splined connection, rotation of the rotor relative to the wheel hub is prevented by the interaction of splines on the hub with corresponding splines on the rotor. Further, axial displacement of the disc brake rotor relative to the wheel hub may be achieved using fasteners in connection with various washers and clips. However, the mating components required for such a splined joint require extensive machining operations to form the splined profiles and the assembly requires use of many different types of clips and fasteners. Additionally, splined joint designs may be more sensitive to heat cycling, and may further use complex mating geometry on the disc brake rotor and wheel hub that may be expensive to manufacture.

SUMMARY

In one aspect of the present disclosure, a disc brake rotor assembly is provided that includes a disc brake rotor and a wheel hub. One of the disc brake rotor and the wheel hub includes a plurality of pairs of partial keyways and the other of the disc brake rotor and the wheel hub includes intermediate partial keyways configured to fit intermediate the pairs of partial keyways to form keyways. The disc brake rotor assembly further includes a plurality of fasteners configured to be received in the keyways to secure the disc brake rotor and the wheel hub together. In this manner, the fasteners are placed in a double shear configuration which reduces the peak shear stress experienced by the fasteners during a braking operation compared to a single shear configuration. The lower peak shear stress improves the durability of the disc brake rotor-wheel hub joint.

In one embodiment, the fasteners include spring pins. The spring pins provide compliance within the disc brake rotor-wheel hub joint by taking up dimensional variations and expanding or contracting during loading which more evenly distributes load and stress throughout the disc brake rotor-wheel hub joint. The spring pins may also expand or contract to accommodate thermal expansion and contraction of the disc brake rotor. The keyways may be sized to slightly compress the outer diameter of the spring pins as the spring pins are installed in the keyways such that the spring pins are resiliently held in the keyways. Spring pins may be installed in the keyways without having to apply a set torque to the spring pins which simplifies installation.

In another aspect, the present disclosure provides a disc brake rotor assembly configured to rotate about a central axis. The disc brake rotor assembly includes a disc brake rotor having rotor bosses and a wheel hub having wheel hub bosses. The disc brake rotor has a center opening that receives the wheel hub and permits the disc brake rotor to be positioned at an initial position on the wheel hub. The disc brake rotor bosses and the wheel hub bosses have a clearance configuration wherein the bosses permit relative axial movement and assembly of the disc brake rotor and the wheel hub. For example, the wheel hub may be stationary and the disc brake rotor is shifted axially along the wheel hub from the initial position to an installation position.

The disc brake rotor bosses and the wheel hub bosses also have an interference configuration wherein the disc brake rotor bosses and wheel hub bosses limit relative axial movement of the disc brake rotor and the wheel hub. The assembled disc brake rotor and the wheel hub are configured to be turned or clocked relative to one another to shift the rotor bosses and the wheel hub bosses from the clearance configuration to the interference configuration. In this manner, a technician may readily install the disc brake rotor on the wheel hub by shifting the disc brake rotor in a first axial direction along the wheel hub to an installation position of the disc brake rotor on the wheel hub and clocking the disc brake rotor relative to the wheel hub to reconfigure the bosses to the interference configuration wherein the bosses keep the disc brake rotor on the wheel hub. The disc brake rotor assembly further includes a plurality of fasteners to secure the disc brake rotor and the wheel hub together with the rotor bosses and the wheel hub bosses in the interference configuration.

In one embodiment, the bosses include a plurality of pairs of bosses of one of the disc brake rotor and the wheel hub and gaps between the pairs of bosses. The bosses further include intermediate bosses of the other the of disc brake rotor and the wheel hub configured to fit between the pairs of bosses. The pairs of bosses overlap the intermediate bosses in an axial direction such that the bosses engage and limit relative axial movement of the disc brake rotor and the wheel hub in two opposite axial directions.

The present disclosure also provides a disc brake rotor assembly including a disc brake rotor, a wheel hub, and a plurality of spring pins to connect the disc brake rotor and the wheel hub. Each spring pin has opposite end portions and an intermediate portion between the end portions. One of the disc brake rotor and the wheel hub has female mounting portions to engage the end portions of the spring pins and the other of the disc brake rotor and the wheel hub has male mounting portions to cooperate with the female mounting portions and engage the intermediate portions of the spring pins. The spring pins are configured to transfer torque from the disc brake rotor to the wheel hub during a braking operation with the female mounting portions of the one of the disc brake rotor and the wheel hub engaging the end portions of the spring pins and the male mounting portions of the other of the disc brake rotor and the wheel hub engaging the intermediate portions of the spring pins. In this manner, the spring pins absorb torque from the brake rotor and transfer the torque to the wheel hub. The resiliency of the spring pins facilitates even distribution of the brake load across the wheel hub. For example, one or more of the spring pins may initially compress upon a brake caliper engaging the disc brake rotor and urging the brake rotor in a rotary manner relative to the wheel hub. The one or more spring pins subsequently expand as the spring pins resiliently urge the brake rotor and wheel hub back to an initial rotary position relative to one another. In some embodiments, the spring pins may be the only component of the disc brake assembly for transferring torque between the disc brake rotor and the wheel hub during a braking operation.

In yet another aspect of the present disclosure, a method is provided for assembling a disc brake rotor assembly including a disc brake rotor and a wheel hub. One of the disc brake rotor and the wheel hub includes a plurality of first partial keyways and a plurality of third partial keyways and the other of the disc brake rotor and the wheel hub includes a plurality of second partial keyways. The method includes positioning the second partial keyways intermediate the first partial keyways and the third partial keyways to form keyways. The method further includes advancing leading end portions of fasteners through the first partial keyways, through the second partial keyways, and into the third partial keyways so that the fasteners extend in the keyways and connect the disc brake rotor and the wheel hub. In this manner, the disc brake rotor and the wheel hub are assembled to form a keyway configured to place the fasteners in a double shear configuration. Further, the fasteners may include spring pins that are pressed into the keyways and provide a compliant disc brake rotor-wheel hub joint which improves the durability of the disc brake rotor-wheel hub joint.

DETAILED DESCRIPTION

Figure 1:
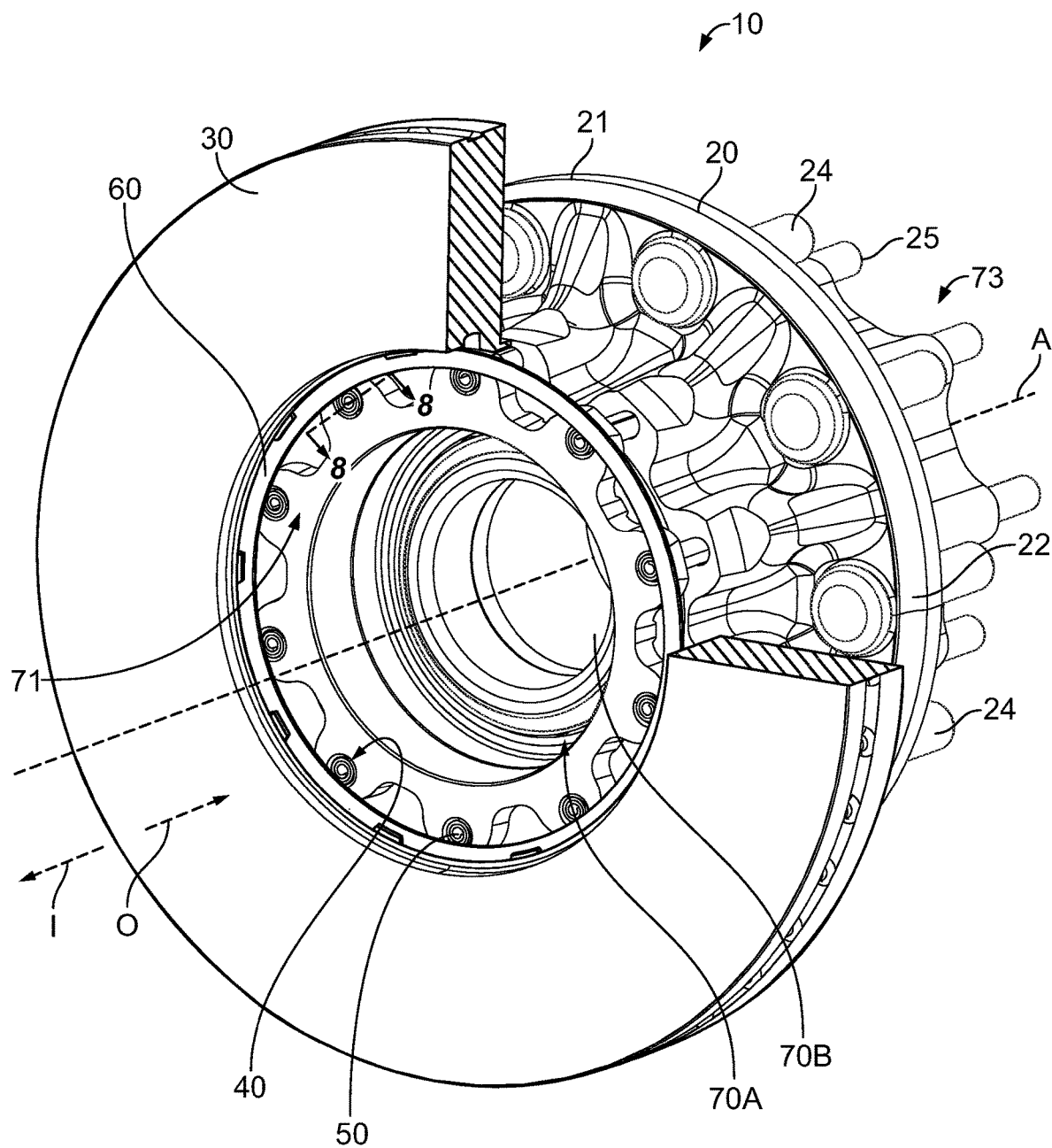
FIG. 1 is a perspective view of an example disc brake rotor assembly having a wheel hub and a disc brake rotor coupled to the wheel hub, the disc brake rotor shown in partial cross-section.
Figure 2:
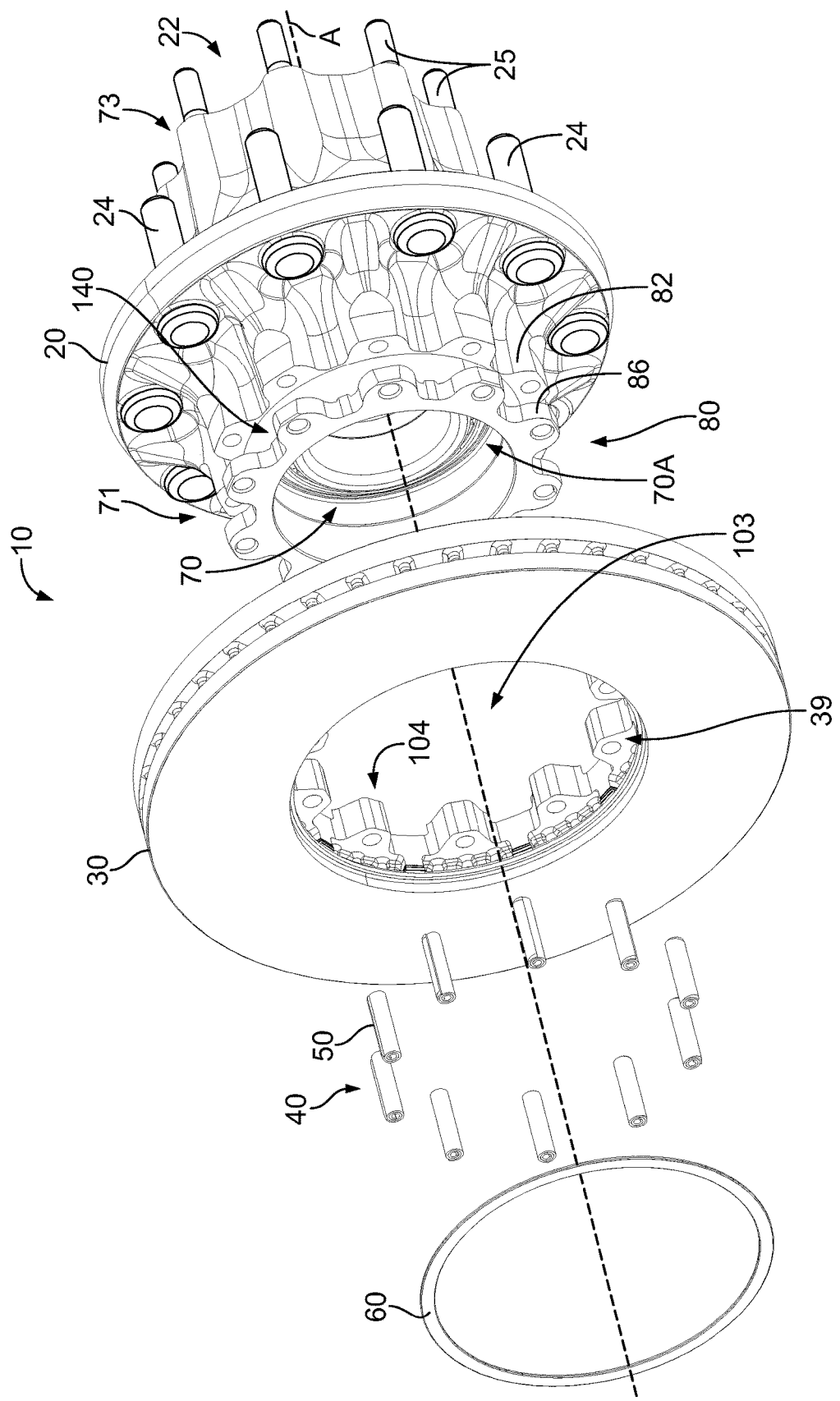
FIG. 2 is an exploded view of the disc brake rotor assembly of FIG. 1 showing the wheel hub, the disc brake rotor, spring pins for coupling the disc brake rotor to the wheel hub, and a retaining ring.

Referring to FIGS. 1-2, a disc brake rotor assembly 10 is provided having a wheel hub 20 and a disc brake rotor 30 secured to the wheel hub 20 using one or more fasteners 40 such as spring pins 50. The wheel hub 20 includes a wheel hub body 21 having an inboard end portion 71 and an outboard end portion 73. The wheel hub body 21 as shown has a unitary, one-piece construction but may alternatively be formed of multiple individually assembled components. As described in further detail below, each of the disc brake rotor 30 and the wheel hub 20 includes one or more mounting portions, such as partial keyway portions, having partial keyways that are configured to be aligned with one another to form completed keyways when the wheel hub 20 and disc brake rotor 30 are assembled such that spring pins 50 may be received therein to secure the disc brake rotor 30 to the wheel hub 20. In some forms, the disc brake assembly 10 includes a retainer such as a retaining ring 60 to inhibit backout of the spring pins 50 once received in the completed keyways. With the disc brake rotor 30 secured to the wheel hub 20 via the spring pins 50, the disc brake rotor assembly 10 may be configured to rotate about a central axis A during, for example, movement of an associated commercial vehicle. In some embodiments, the commercial vehicle may be a class 2 vehicle or greater. The disc brake rotor 30 may be made of cast iron and the wheel hub body 21 may be made of ductile iron or aluminum.

In the illustrated form, the outboard end portion 73 of the wheel hub 20 includes a flange portion 22 having a plurality of studs 24 for receiving a wheel. In some embodiments, the studs 24 may be threaded for receiving a corresponding lugnut to secure the wheel to the wheel hub 20. As illustrated, the wheel hub 20 also includes a plurality of studs 25 for receiving a drive flange of the vehicle. For non-drive wheel embodiments, the wheel hub may not include studs 25. The wheel hub 20 also includes a pair of bearing assemblies 70A, a spacer 70B, and a central through opening 70 for receiving a spindle of a vehicle. A central wheel hub axis H (FIG. 3) extends through a center of the central through opening 70.

Figure 3:
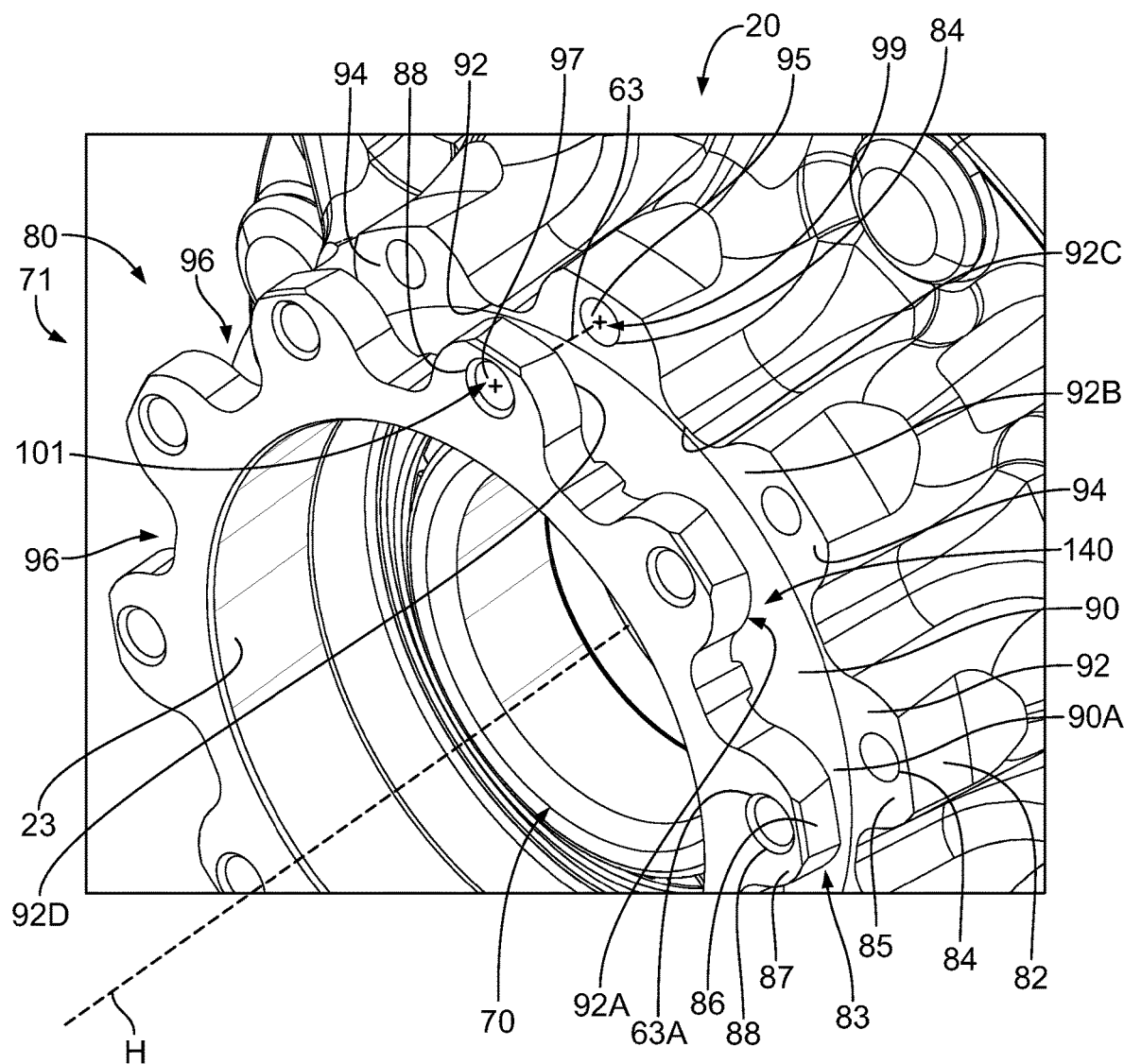
FIG. 3 is an enlarged perspective view of the wheel hub of FIG. 2 showing pairs of bosses having aligned partial keyways and a channel between the pairs of bosses to receive a center flange of the disc brake rotor.

As shown in FIG. 3, the inboard end portion 71 of the wheel hub 20 has a plurality of supports or mounting portions for connecting to the disc brake rotor 30. In one embodiment, the mounting portions include female mounting portions 80 that include partial keyway portions 81. The partial keyway portions 81 include pairs of outboard partial keyway portions 85 and inboard partial keyway portions 83 having partial keyways 111, 113 (see FIG. 10). As illustrated, the outboard partial keyway portions 85 include the outboard bosses 82 and the inboard partial keyway portions 83 include the inboard bosses 86. The outboard bosses 82 and inboard bosses 86 extend radially outward from a wall 23 of the wheel hub body 21.

The partial keyways 111, 113 include openings 84, 88 having inner, arcuate surfaces 95, 96 configured to extend about a portion of the outer surface of the spring pins 50. The inboard bosses 86 are axially spaced from the plurality of outboard bosses 82 by axial gaps 97, and the openings 84, 88 are shown aligned along an axis 63 extending through the centers 99, 101 of the openings 84, 88. The axis 63 extends parallel to the central axis H and the openings 84, 88 overlap in an axial direction along the axis 63. In other embodiments, the axis 63 extending through the openings 84, 88 of the bosses 82, 86 may extend transversely relative to the central axis A such that the spring pins 50 may be installed in a generally angled manner and a length of each of the spring pins 50 extends at an angle between about 0 degrees to about 90 degrees relative to central axis A. The outboard and inboard bosses 82, 86 are generally shown as protruding radially outward of the wall 23 of the central opening 70 of the wheel hub 20. As shown, a wheel hub pilot surface 90 is located between the outboard and inboard bosses 82, 86 for engaging with the disc brake rotor 30 as explained in further detail below. The female mounting portions 80 may include the inboard and outboard bosses 82, 86, the gaps 97 therebetween, and surface portion 90A of the wheel hub pilot surface 90 which receive male mounting portions 104 of the disc brake rotor 30.

Referring to FIG. 3, the wheel hub 20 includes an annular channel 140 extending about the wall 23 that is at least partially defined by opposite surfaces of the outboard and inboard bosses 82, 86 facing one another. The channel 140 is configured to receive a center flange 39 of the disc brake rotor 30 and has radially extending stop surface 92 and a radially extending stop surface 92A. By radially extending, it is intended that the stop surfaces 92, 92A extend along the radial direction, such as a flat radial surface, but may encompass other shapes and orientations such as slightly conical surface having an angle of 0.5 to 5 degrees relative to the radial direction. The stop surface 92 includes stop surface portions 92B of inboard faces of the outboard bosses 82, stop surface portions 92C extending between the outboard bosses 82, and stop surface portions 92D of outboard faces of the inboard bosses 86.

The plurality of inboard bosses 86 include circumferential gaps 96 extending therebetween that are sized and configured to receive corresponding male mounting portions 104 of the disc brake rotor 30. Specifically, the male mounting portions 104 may be axially advanced onto the inboard end portion 71 of the wheel hub 20 until the disc brake rotor 30 reaches an installation position on the wheel hub 20 and abuts the stop surface 92. The stop surface 92 inhibits outboard axial movement of the disc brake rotor 30 beyond the channel 140.

Figure 4:
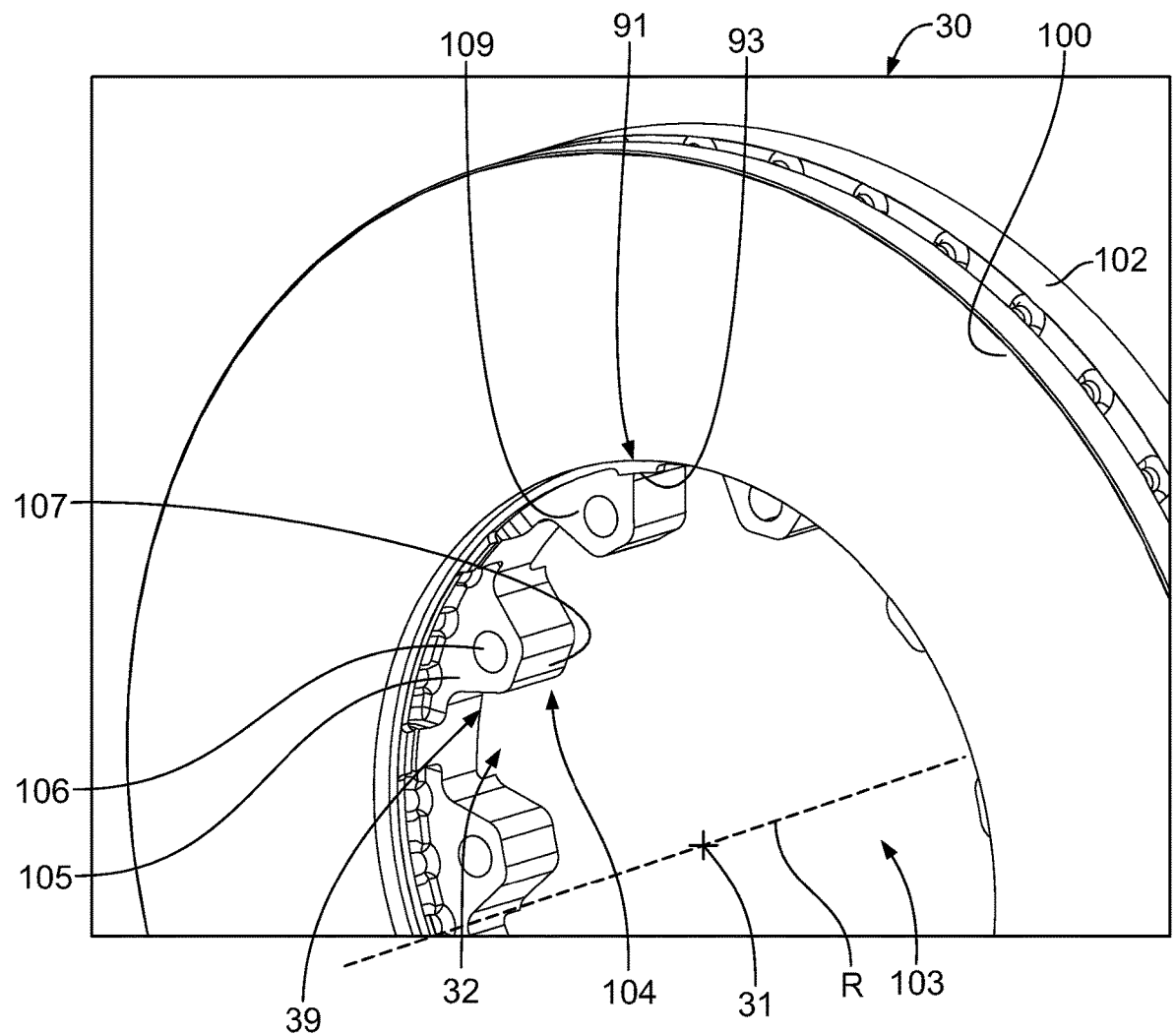
FIG. 4 is an enlarged perspective view of the disc brake rotor of FIG. 2 showing the center flange including bosses extending radially inward in a central opening, the rotor bosses having partial keyways.
Figure 6:
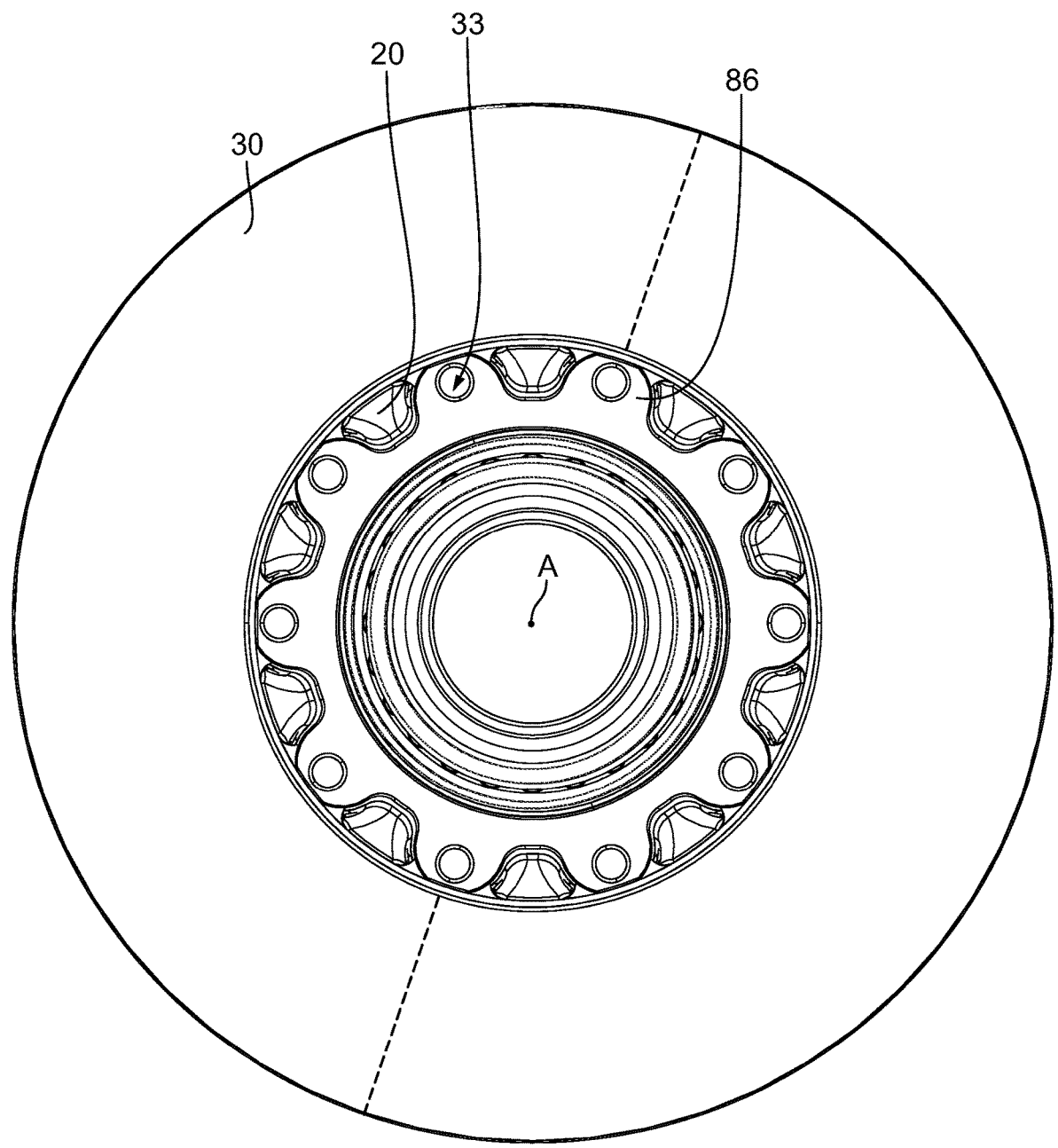
FIG. 6 is a front elevational view similar to FIG. 5 showing the disc brake rotor and wheel hub in an interference configuration thereof after the disc brake rotor has been positioned on the wheel hub and clocked.

As shown in FIG. 4, the disc brake rotor 30 is generally annular and has an inboard cheek 100, an outboard cheek 102, and a central opening 103. A central axis R extends through the central opening 103 at a center 31 thereof. The disc brake rotor 30 includes structures along its center flange 39 that are configured to interact and engage with structures of the wheel hub 20. These structures include a plurality of mounting portions such as male mounting portions 104 having partial keyways portions 109 that include lugs or bosses 105. In one embodiment, the bosses 105 extend radially inward into the opening 103 and each have an intermediate keyway 115 (see FIG. 10) including an opening 106. More specifically, the bosses 105 are configured to be positioned intermediate the outboard and inboard bosses 82, 86 of the wheel hub 20 such that the openings 84, 88, 106 may be aligned to form a completed keyway 33 (FIG. 6) extending through the bosses 82, 86, 105 for receiving a spring pin 50 therein.

As described in further detail below, the wheel hub 20 and the disc brake rotor 30 may be moved between (1) a clearance configuration where the bosses 105 of the disc brake rotor 30 are rotationally offset from the bosses 86 of the wheel hub 20 to permit the bosses 105, 86 to slide past one another, and (2) an interference configuration where the bosses 105 of the disc brake rotor 30 are outboard of and axially overlapping with the bosses 86 of the wheel hub 20 such that the disc brake rotor 30 is inhibited from moving off of the wheel hub 20 in an axially inboard direction. In one embodiment, the interference configuration includes the bosses 105 being positioned between pairs of bosses 82, 86 of the wheel hub 20 such that the bosses 82, 86 inhibit movement of the disc brake rotor 30 in inboard and outboard axial directions.

Similar to the female mounting portions 80 of the wheel hub 20, the openings 106 of the mounting portions 104 are likewise configured extend about the outer surface of the spring pins 50. Each boss 105 may further include a rotor pilot surface 107 that is configured to engage with and slide rotationally about the hub pilot surface 90 in the channel 140 when the bosses 82, 86, 105 are in a clearance configuration as described below. Additionally, the disc brake rotor 30 may include a retaining structure 91 such as protrusions or tabs 93 extending radially inward into the opening 103 that are configured to retain the retaining ring 60 once the disc brake rotor assembly 10 has been assembled in the manner described below. In another embodiment, the disc brake rotor 30 may include a continuous groove extending about the central opening 103 for receiving the retaining ring 60 in the installed state.

To assemble the disc brake rotor 30 and the wheel hub 20, the bosses 105 of the disc brake rotor 30 are then rotationally aligned with and superimposed over the gaps 96 extending between the inboard bosses 86 of the wheel hub 20. In other words, the bosses 105 of the disc brake rotor 30 are positioned to overlap the gaps 96 in an axial direction and be rotationally offset from the inboard bosses 86, which may be referred to as a clearance configuration.

Once aligned in this manner, the disc brake rotor 30 may be moved relative to the wheel hub 20 in the direction O (FIG. 1) such that the bosses 105 of the disc brake rotor 30 are moved into and through the gaps 96 until engaged with and abutting the stop surface 92 of the wheel hub 20. This relative movement is intended to encompass, for example, moving the disc brake rotor 30 towards the wheel hub 20, moving the wheel hub 20 towards the disc brake rotor 30, or moving both the wheel hub 20 and disc brake rotor 30 towards one another. For example, the wheel hub 20 may be advanced in direction I towards the disc brake rotor 30 and the bosses 86 of the wheel hub 20 are moved into and through the gaps 32 between the bosses 105 of the disc brake rotor 30 until the bosses 105 of the disc brake rotor 30 engage with and abut the stop surface 92. Once the pilot surfaces 107 of the rotor center flange 39 are positioned in the channel 140 and engaged with the wheel hub pilot 90, the disc brake rotor 30 may be turned freely relative to the wheel hub 20 in the channel 140.

Figure 5:
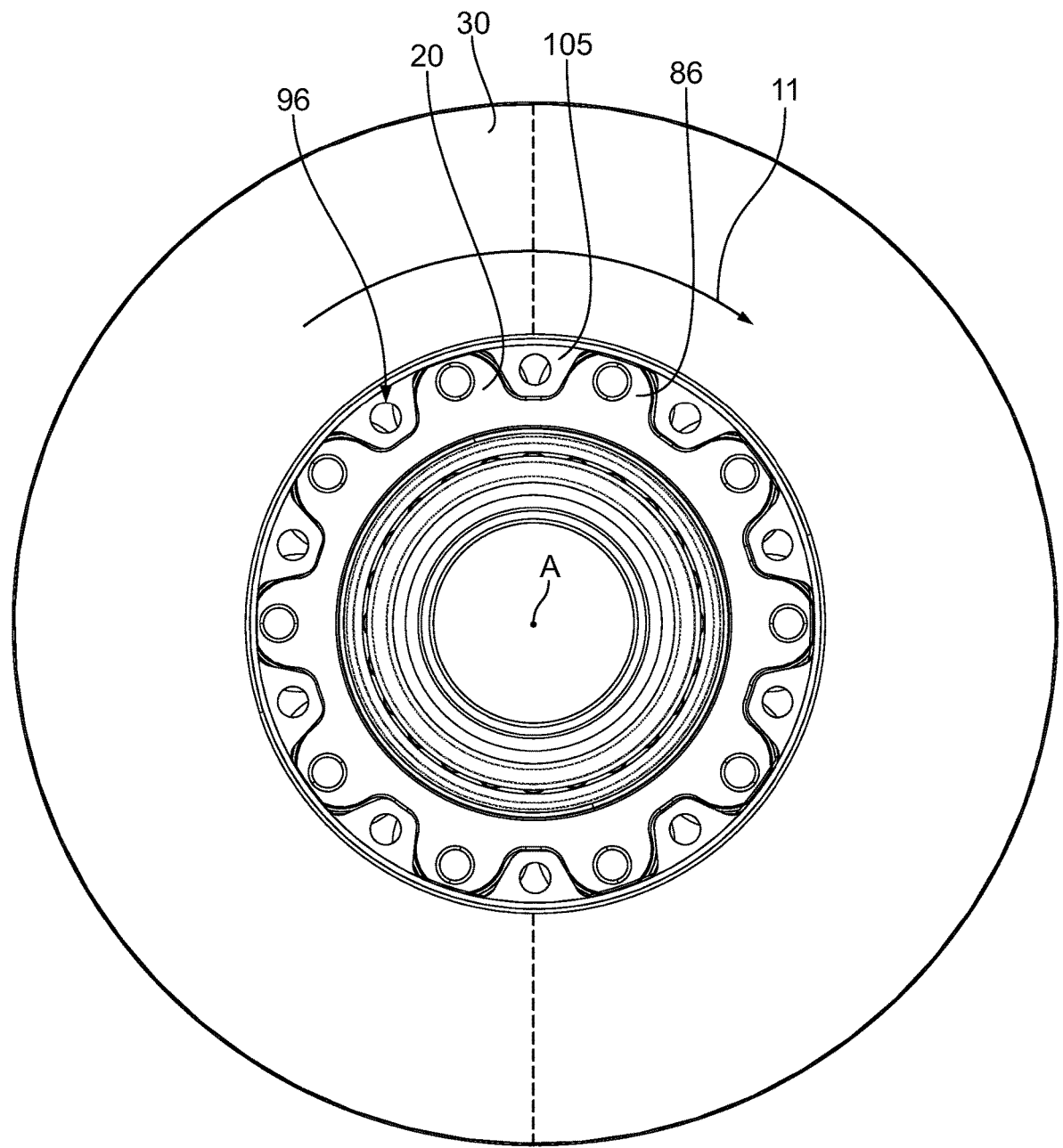
FIG. 5 is an elevational view of the wheel hub and disc brake rotor of FIG. 1 in a clearance configuration thereof that permits the disc brake rotor to be slid axially onto the wheel hub.

The assembly of the disc brake rotor 30 and the wheel hub 10 next includes turning the disc brake rotor 30 (e.g., in direction 11 shown in FIG. 5) into an interference configuration where the openings of the bosses 82, 86, 105 are aligned. Specifically, the disc brake rotor 30 is turned relative to the wheel hub 20 (i.e., clocked) until the bosses 105 are axially intermediate the pairs of outboard and inboard bosses 82, 86 of the wheel hub 20 and the openings 84, 88, 106 are aligned to form the completed keyway 33 for receiving a spring pin 50 therein. When the disc brake rotor 30 and the wheel hub 20 are positioned in the interference configuration, inboard and outboard surfaces of the rotor bosses 105 are positioned in a confronting relationship with the bosses 82, 86 of the wheel hub 20 so as to inhibit relative axial movement along the axis A.

The assembly process includes inserting spring pins 50 into the completed keyways 33 to secure the disc brake rotor 30 to the wheel hub 20. Thereafter, the retaining ring 60 is installed by radially compressing the retaining ring 60 and axially advancing the retaining ring 60 outboard beyond tabs 93 of the rotor 30 and permitting the retaining ring 60 to resiliently radially expand and be held between the tabs 93 and an inboard surface 87 of the inboard bosses 86. So configured, the retaining ring 60 extends radially inwardly and at least partially overlaps the opening 88 of the inboard bosses 86 to axially constrain the spring pins 50 within the completed keyways 33 and inhibit backout of the spring pins 50 from the keyways 33. In a reverse manner, the disc brake rotor 30 may be removed from the wheel hub 20 by compressing and removing the retaining ring 60, withdrawing the spring pins 50 from the keyways 33, rotating the disc brake rotor 30 from the interference configuration (FIG. 6) to the clearance configuration (FIG. 5) in a direction opposite direction 11, and axially moving the disc brake rotor 30 in direction I along the axis A (FIG. 1) relative to the wheel hub 20. In both the clearance and interference configurations, the central axis R of the disc brake rotor 30 and the central axis H of the wheel hub 20 are coaxial with one another along the central axis A.

Additionally or alternatively, the bosses 82, 86, 105 may be of different, varying configurations on one or both of the disc brake rotor 30 and wheel hub 20. For example, although the wheel hub 20 has outboard and inboard pairs of bosses 82, 86 and the disc brake rotor 30 has bosses 105 configured to be positioned therebetween, the opposite is also possible. Specifically, in another embodiment, the disc brake rotor 30 has pairs of outboard and inboard bosses and the wheel hub 30 has bosses configured to be positioned intermediate the inboard and outboard bosses of the disc brake rotor 30. In still further embodiments, each of the wheel hub and disc brake rotor may include arrays of two or more mounting portions or bosses configured to be aligned in an alternating stacked configuration (i.e., a rotor boss, a wheel hub boss, a rotor boss, and a wheel hub boss) such that a spring pin positioned in a completed keyway defined thereby may be in a variety of shear configurations. In the context of the present disclosure, a pair of bosses should be understood to encompass two or more bosses.

Figure 7:
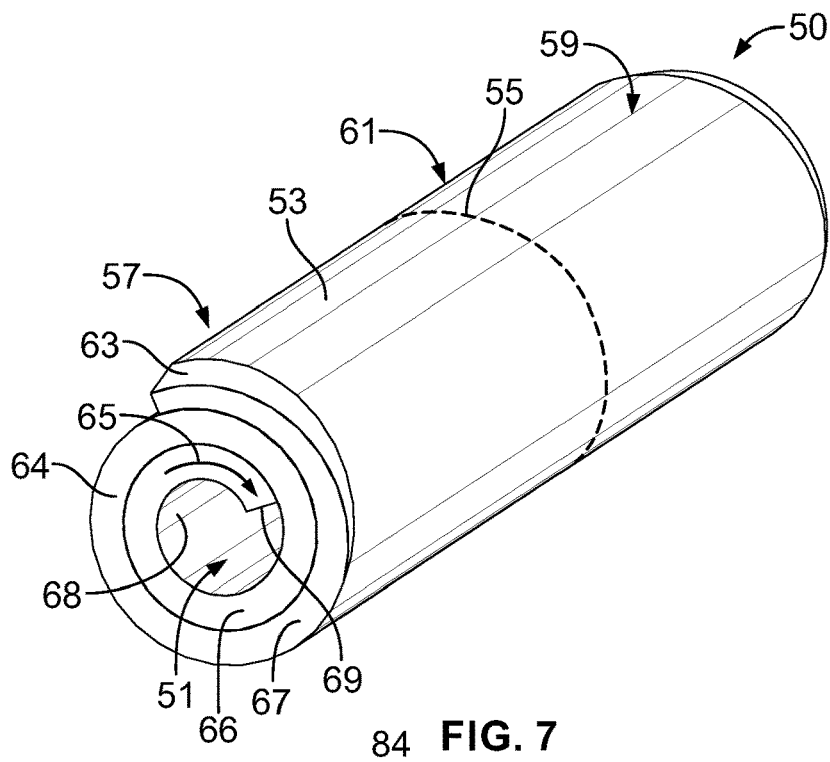
FIG. 7 is a perspective view of one of the spring pins of FIG. 2 for being received in a completed keyway formed by the aligned partial keyways of the disc brake rotor and wheel hub.

Referring now to FIG. 7, an example fastener 40 in the form of a spring pin 50 for use as a "key" in the completed keyways 33 of the assembly 10 is shown. The spring pin 50 is configured to be used for both securing the disc brake rotor 30 to the wheel hub 20 and for transmitting rotational torque therebetween such as during a braking operation. Each spring pin 50 may be formed by wrapping a strip of material around a mandrel including multiple wrapped layers 66, 67 of the material, such as metal (e.g., steel or nickel) and may include an internal bore 51 having an internal surface 68. So configured, the spring pin 50 may include multiple wrapped layers 66, 67 of material wrapping around the central bore 51 and includes an edge 69 of layer 66 at least partially in the bore 51. The spring pin 50 has an outer surface 53 and includes chamfered edges 63. The spring pin 50 has a circumference 55 that extends around the cylindrical outer surface 53 of the spring pin 50. It should be understood in the context of the present disclosure that the term circumference is intended to refer to a boundary of a curved geometric figure. Thus, the outer surface 53 is described as a circumference herein despite the outer surface 53 having a spiral-shape due to the wrapped configuration of the spring pin 50.

When a disc brake caliper frictionally engages the disc brake rotor 30 during a braking operation, the spring pin 50 is configured to radially compress due to its multi-layer construction to assist in absorbing shock and vibrations that are transferred between the brake rotor 30 and the wheel hub 20. Specifically, the spring pin 50 may be compressed as forces are applied to the outer surface 53 thereof and the layers 66, 67 of the spring pin 50 may shift relative to one another along the direction 65 such that the edge 69 shifts along an inner surface of the layer 66 and the spring pin 50 constricts in a spiral-like manner. The spring pin 50 resiliently expands or rebounds with the layers 66, 67 shifting relative to one another when the forces are removed.

Figure 8:
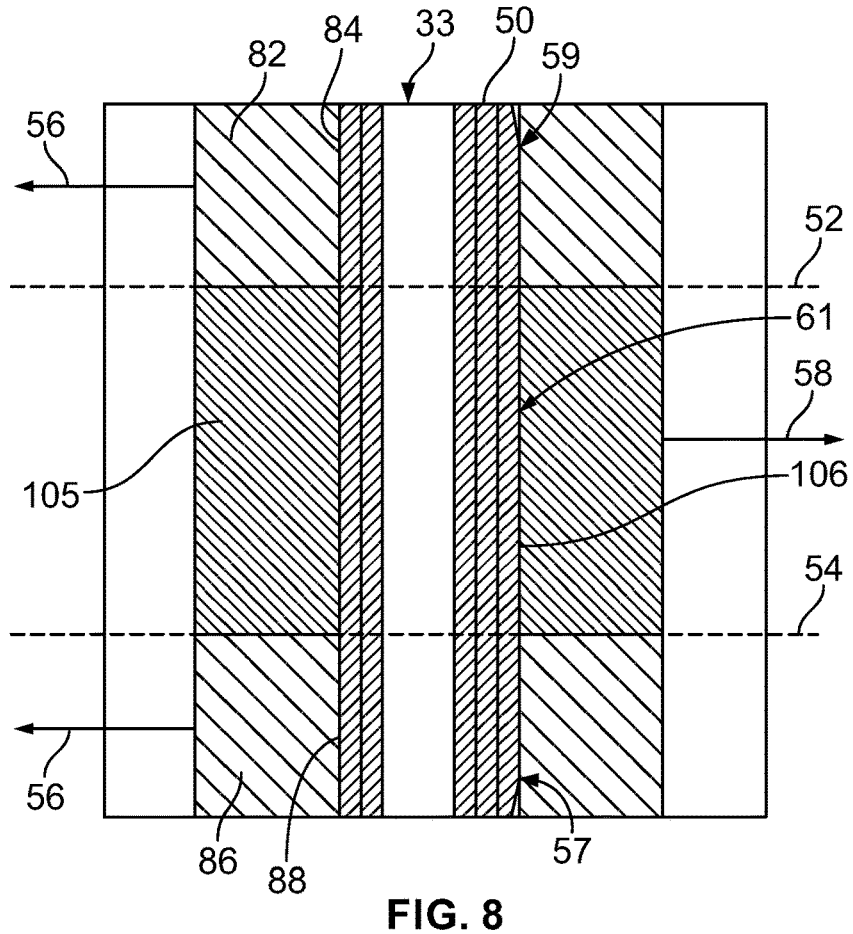
FIG. 8 is a cross-sectional view taken along line 8-8 in FIG. 1 showing a spring pin received in the partial keyways of the disc brake rotor and the wheel hub such that the spring pin is in a double shear configuration.

In some forms, the spring pin 50 may be installed in a single shear configuration (i.e., having one shear plane) or a double shear configuration (i.e., having two shear planes; see FIG. 8 showing shear planes 52, 54) to improve the overall shear strength of the pins 50. Due to the wrapped and overlapping nature of the spring pins 50 as described above, the spring pins 50 may be more flexible and resilient to provide compliance within the disc brake rotor 30 and wheel hub 20 coupling joint without slop. That is, for installation into the completed keyways 33, the spring pins 50 may be resiliently compressed during insertion into the keyways 33 such that the outer circumference 55 may be partially reduced. For example, the spring pin 50 has a chamfered surface 63 that engages a chamfered surface 63A of the opening 88 (see FIGS. 3 and 7).

Once inserted into the keyways 33, the spring pins 50 may resiliently expand and return to their original circumference 55 thereby taking up any dimensional variation between the disc brake rotor 30 and wheel hub 20. Further, the spring pins 50 permit the disc brake rotor 30 to thermally expand more easily due to the layers 66, 67 of the spring pin 50 being able to shift relative to one another (e.g., in direction 65) as the spring pin 50 expands and contracts when force is applied thereto. During a braking operation, the spring pins 50 likewise permit a more even distribution and transfer of torsional forces between the components due to the spring-like nature of the pins 50.

In some forms, at an initial point when a brake caliper engages the disc brake rotor 30 during a braking operation, the brake caliper urges the disc brake rotor 30 in a rotary direction relative to the wheel hub 20. The spring pins 50 nearest to the brake caliper may initially compress in the manner described above to absorb torque being transferred to the wheel hub 20 and spring pins 50 farther away from the brake caliper about the circumference of the disc brake rotor 30 may take up relative movement of the disc brake rotor 50. The compression of the spring pins 50 quickly evens out such that the spring pins 50 experience similar compression during the rest of the duration of the braking operation. In some embodiments, the spring pins 50 may be SPIROL® brand spring pins.

Spring pins 50 may be sheared in multiple planes, for example, a spring pin 50 that fails in single shear configuration would result in two broken, separate pieces of the pin, whereas a spring pin that breaks in a double shear configuration would result in three separate pieces. A double shear configuration may be preferable in some instances because the spring pin 50 experiences approximately half of the peak shear stress applied to the spring pin 50 at each of two different planes as it would if only a single shear plane were provided. Thus, embodiments of the disc brake rotor assembly having a double shear configuration may be preferable in some applications to reduce the shear stress in the spring pin 50 and increase durability of the disc brake rotor-wheel hub joint.

Referring now to FIG. 8, a cross-sectional view is shown illustrating a spring pin 50 received in a completed keyway 33 formed by aligned openings 84, 88, 106 of the bosses 82, 86, 105 of the disc brake rotor 30 and wheel hub 20. The spring pin 50 has a first end portion 57, a second end portion 59, and an intermediate portion 61. As shown, the spring pin 50 is installed in a double shear configuration such that two separate shear planes 52, 54 exist (i.e., one between first end portion 57 and intermediate portion 61 and one between intermediate portion 61 and second end portion 59) normal to the central axis A of the assembly 10 to improve the shear strength of the spring pin 50 as explained above. When a brake caliper engages the disc brake rotor 30 during a braking operation, the brake caliper urges the disc brake rotor 30 in a rotary direction opposite the direction of rotation of the wheel hub 20 and imparts a torque on the disc brake rotor 30.

The torque is transferred from the disc brake rotor 30 to the spring pins 50 via the bosses 105. The torque load is at least partially absorbed by the spring pins 50 as described above and transferred to the wheel hub 20 via the bosses 82, 86. An example of the forces acting on one of the spring pins 50 is shown in FIG. 8. Specifically, forces 56, 58 are applied to the spring pins 50 by the bosses 82, 86, 105 which imparts shear stress along each of the two shear planes 52, 54. That is, force 58 is applied to the intermediate portion 61 of the spring pin 50 by the disc brake rotor 30 and reaction forces 56 are applied to the end portions 57, 59 of the spring pin 50 by the wheel hub 20.

Figure 9:
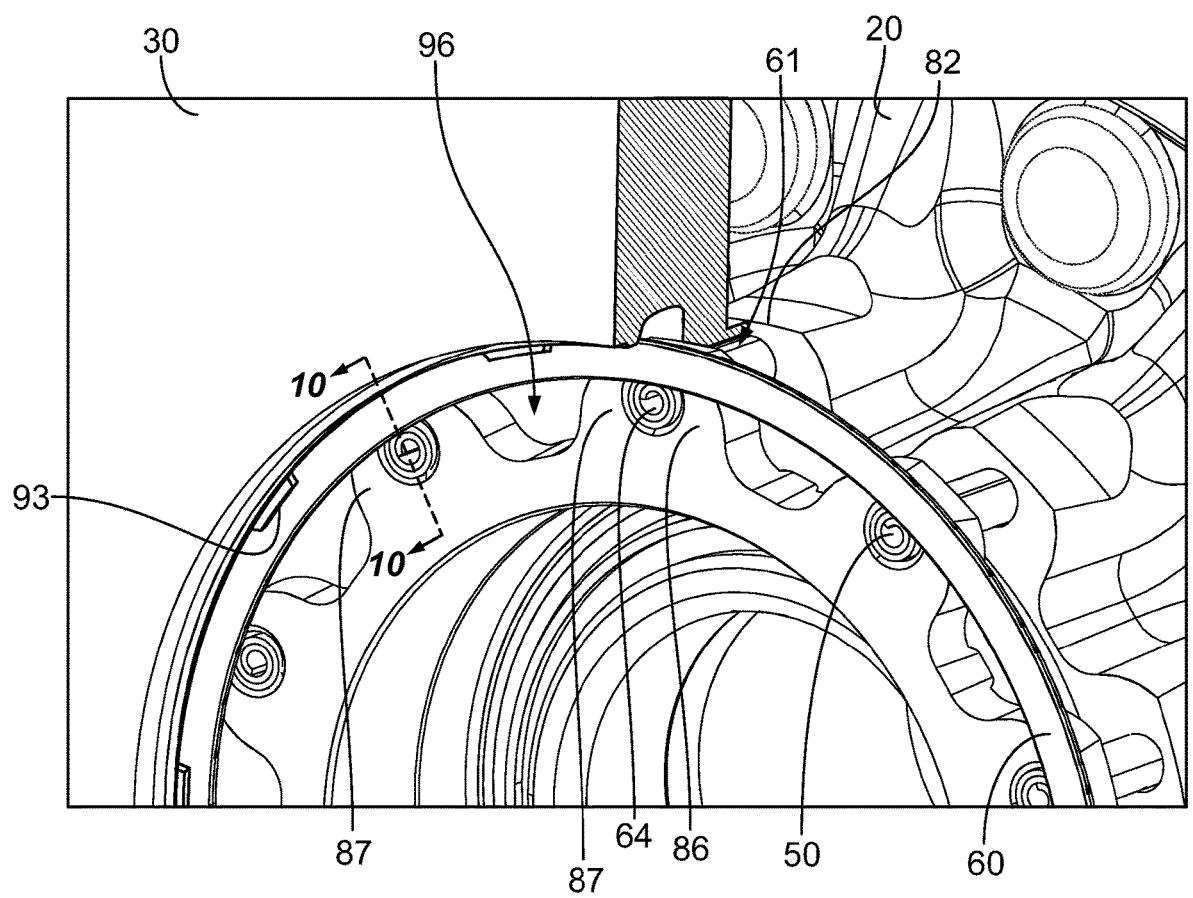
FIG. 9 is an enlarged perspective view of FIG. 1 showing the retaining ring positioned to inhibit back-out of the spring pins from the keyways.

FIG. 9 shows an enlarged perspective view of the disc brake assembly 10 with the disc brake rotor 30 in partial cross-section and showing the retaining ring 60 held between the tabs 93 of the disc brake rotor 30 and inboard surface portions 87 of the inboard bosses 86 to block axial movement of the spring pins 50 from the completed keyways 33. As illustrated, the retaining ring 60 is sized to at least partially overlap an end portion 64 of each spring pin 50 to constrain and inhibit movement of the spring pins 50 in direction I (see FIG. 1). The tabs 93 extending radially inward of the opening 103 are configured to keep the retaining ring 60 in position near the spring pins 50 once the retaining ring 60 has been installed. As shown, the disc brake assembly 10 is in the assembled configuration where the rotor bosses 105 are axially intermediate the outboard and inboard bosses 82, 86 of the wheel hub 20 and the spring pins 50 are in a double shear configuration.

Figure 10:
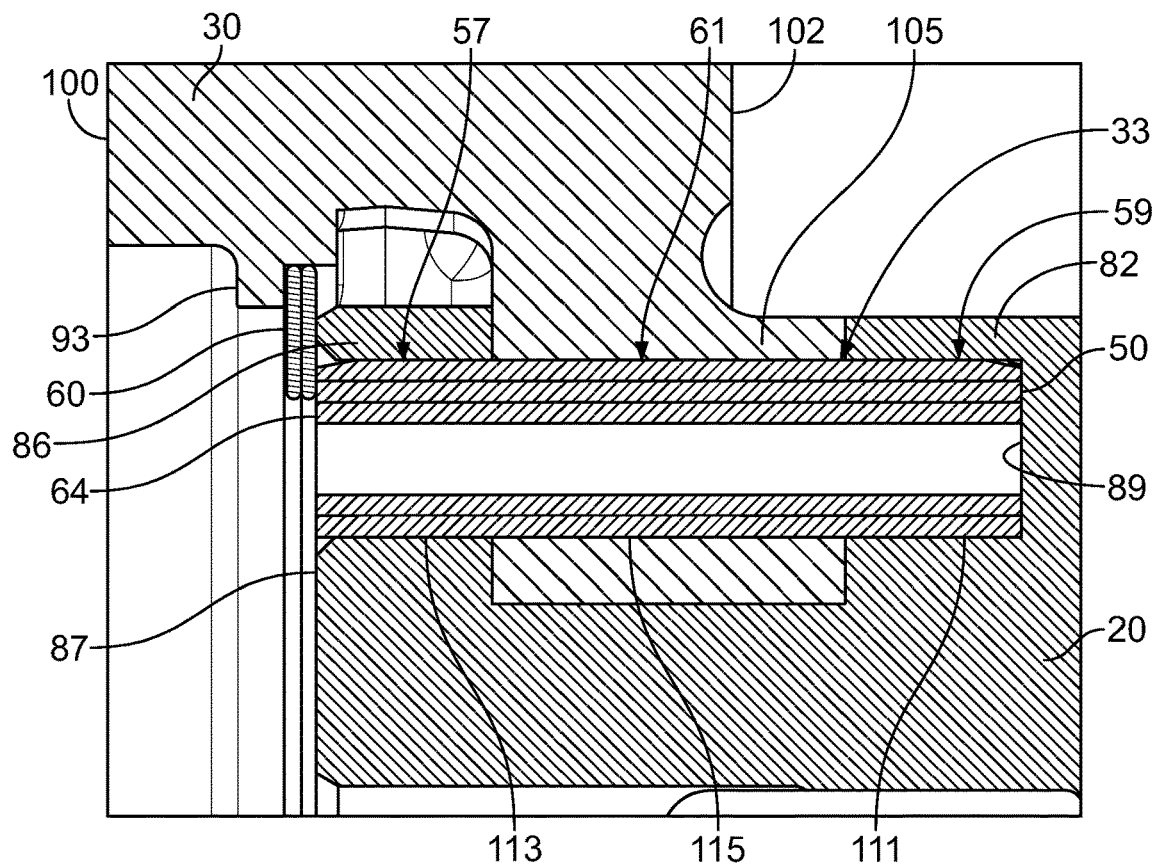
FIG. 10 is a cross-sectional view of the disc brake rotor assembly of FIG. 9 taken along line 10-10 showing one of the spring pins received in a keyway formed by partial keyways of the disc brake rotor and the wheel hub and the retaining ring axially overlapping the spring pin.

FIG. 10 is a cross-sectional view of the disc brake assembly 10 in an assembled configuration illustrating a spring pin 50 received in a completed keyway 33 formed by the boss 105 of the disc brake rotor 30 and the outboard and inboard bosses 82, 86 of the wheel hub 20. The retaining ring 60 is installed and held between the tabs 93 and the outer surface portion 87 of the inboard boss 86 superimposed or overlapping the end surface 64 of the spring pin 50. In this embodiment, the partial keyways 111, 113, 115 of the bosses 82, 86, 105 respectively are configured to each extend around an entirety of the circumference 55 of the spring pin 50 such that the outer surface 53 of the spring pin 50 is encircled and the spring pin 50 functions as a key within the completed keyway 33. However, in other embodiments, any or all of the partial keyways 111, 113, 115 may extend around less than the entire circumference of the spring pins 50 (see, e.g., FIGS. 13-16). As illustrated, the partial keyway 111 of the outboard boss 82 is a blind bore and includes an internal stop surface 89 configured to abut the second end portion 59 of the spring pins 50 such that the spring pins 50 are axially constrained between the stop surface 89 at the second end portion 59 of the spring pin 50 and the retaining ring 60 at the first end portion 57 thereof in the assembled state.

Figure 11:
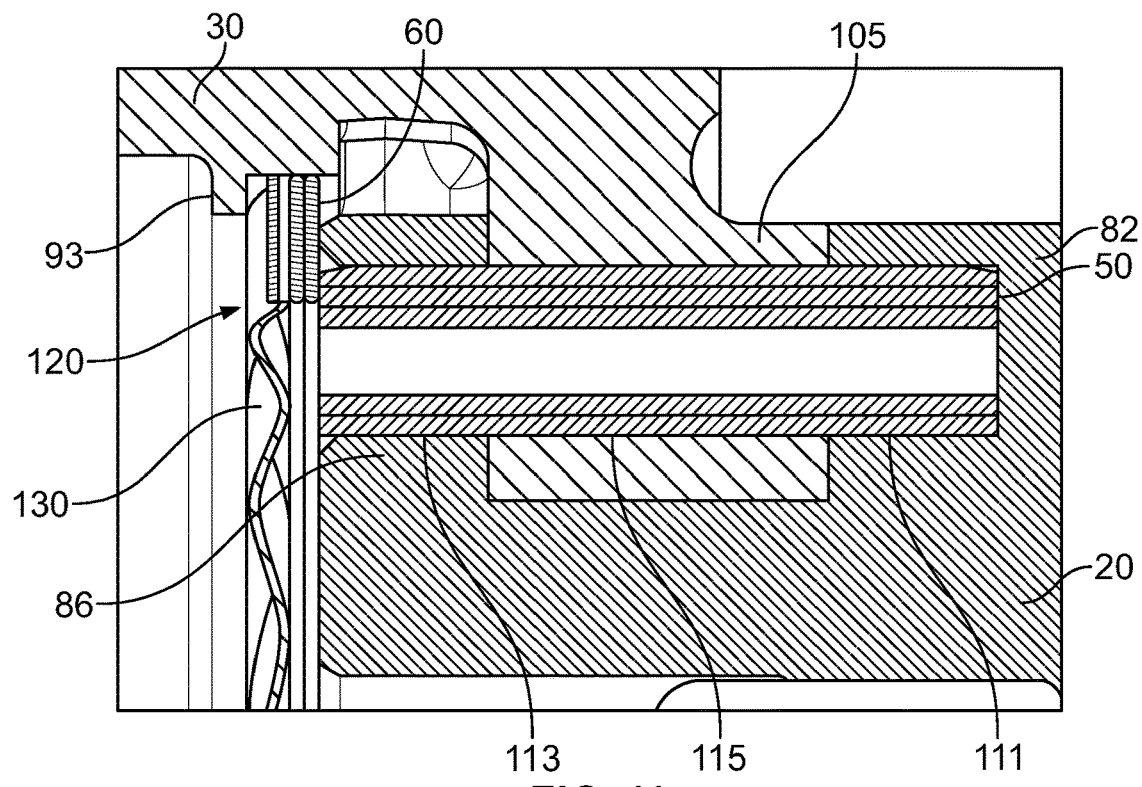
FIG. 11 is a cross-sectional view similar to FIG. 10 of another disc brake rotor assembly including a spacer between portions of the disc brake rotor and wheel hub.

In one alternative form as shown in FIG. 11, the disc brake assembly 10 may further include a spacer 120, such as a wave spring 130, to reduce axial play between the retaining ring 60 and surfaces of the disc brake rotor 30 and the wheel hub 20 in the assembled configuration. As shown, the spacer 120 is positioned axially between the retaining ring 60 and tabs 93 of the disc brake rotor 30. The spacer 120 may in some forms be beneficial as it may permit looser machining tolerances such that the spacer 120 can accommodate and account for any potential gaps between the inboard surface portions 87 of the inboard bosses 86, the retaining ring 60, and the tabs 93, such that the retaining ring 60 may be securely held between the inboard surface 87 and the tabs 93.

Figure 12:
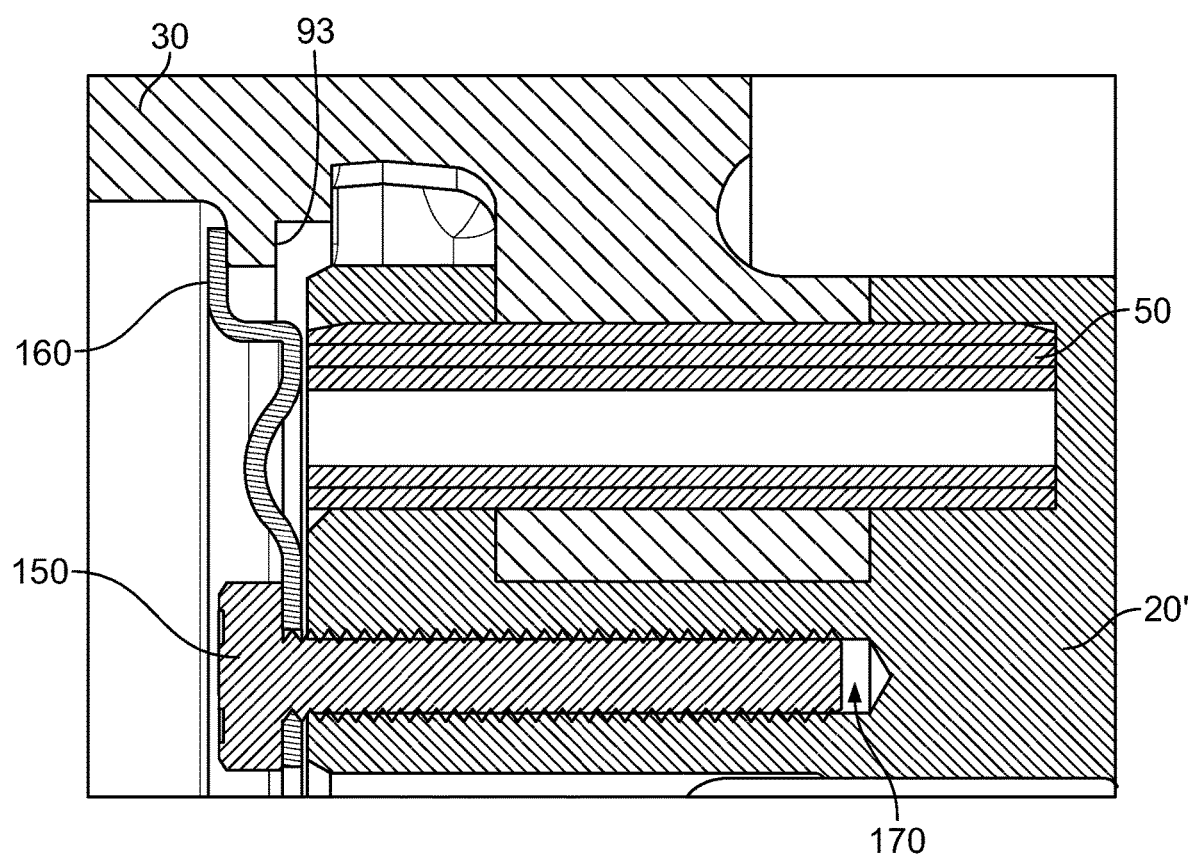
FIG. 12 is a cross-sectional view similar to FIG. 10 of another disc brake assembly including a bolt and a washer that retains a spring pin in a keyway formed by a disc brake rotor and a wheel hub of the disc brake assembly.

In still other embodiments, such as in FIG. 12, the disc brake rotor assembly 10 may include a retainer comprising a fastener such as threaded bolt 150 and a washer 160 to inhibit back-out of the spring pins 50 from the completed keyways. In such forms, the wheel hub 20' includes a threaded bore 170 in which the fastener 150 is configured to thread into.

Figure 13:
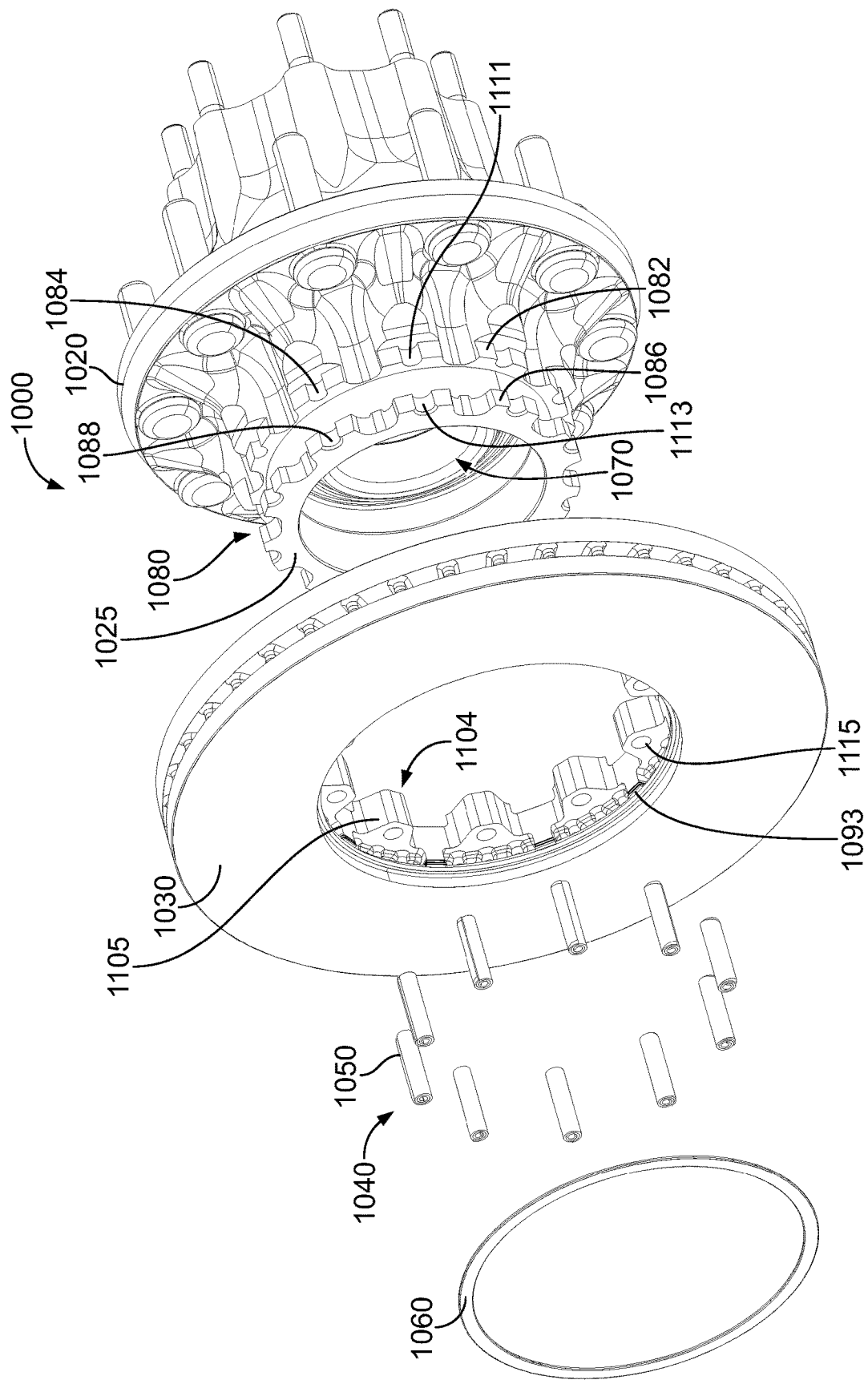
FIG. 13 is an exploded view of another disc brake assembly including a wheel hub having bosses with partial keyways to receive spring pins, the bosses configured to extend around less than an entire circumference of the spring pins.
Figure 14:
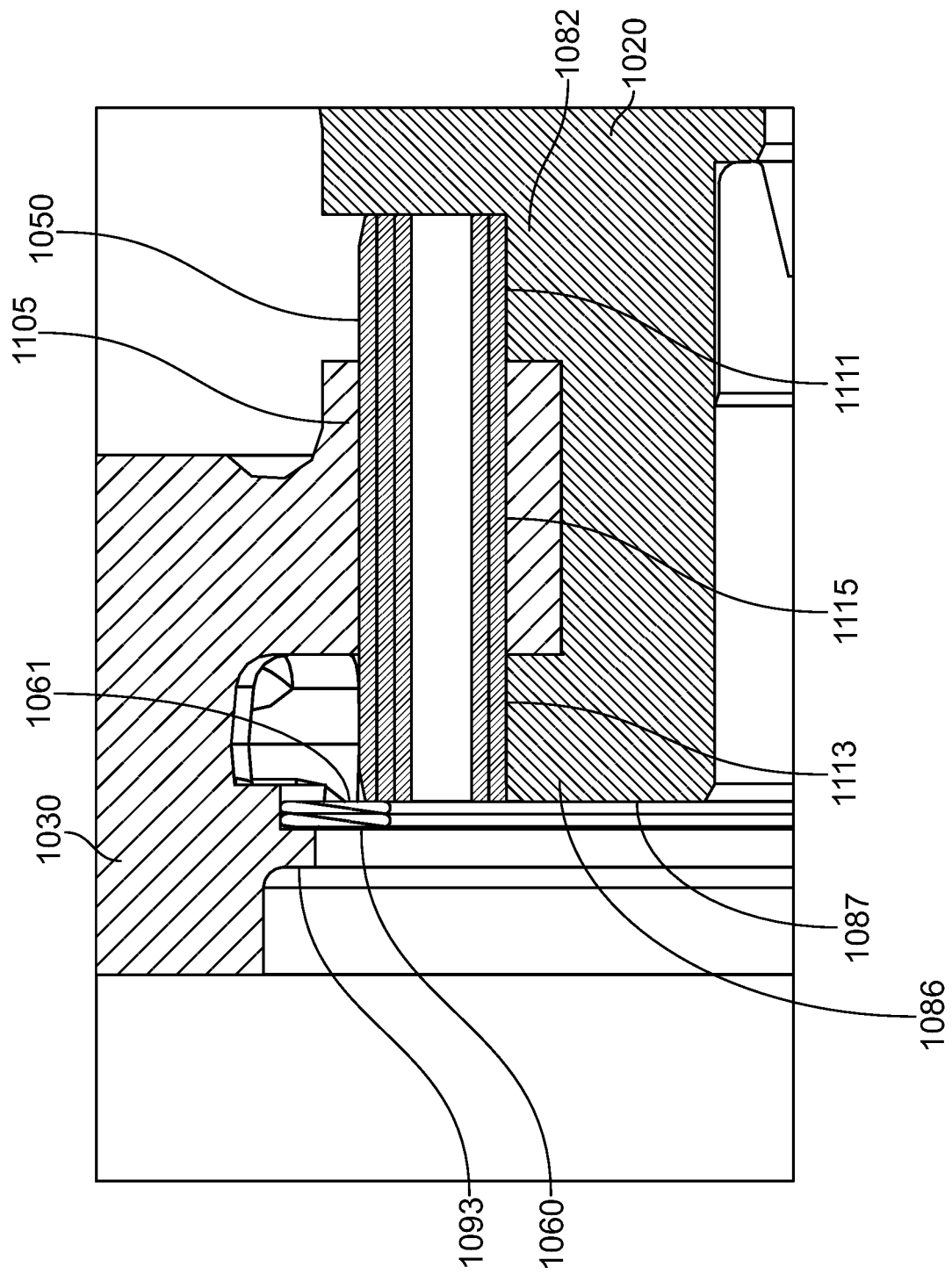
FIG. 14 is a cross-sectional view of a portion of the assembled disc brake rotor assembly of FIG. 13 showing a spring pin received in partial keyways of the disc brake rotor and wheel hub.

Referring now to FIGS. 13 and 14, another disc brake assembly 1000 is provided that is substantially similar to the disc brake assembly 10 such that any differences will be described hereinafter. Similar to disc brake assembly 10, the disc brake assembly 1000 includes a wheel hub 1020 and a disc brake rotor 1030 configured to be secured to the wheel hub 1020 using one or more fasteners 1040 such as spring pins 1050. Each of the disc brake rotor 1030 and the wheel hub 1020 include one or more mounting portions such as male mounting portions 1104 and female mounting portions 1080. The male and female mounting portions 1104, 1080 include bosses 1105, 1082, 1086 having partial keyways 1115, 1111, 1113 that are configured to be aligned to form completed keyways upon assembly of the wheel hub 1020 and disc brake rotor 1030 such that a spring pin 1050 may be received therein to secure the disc brake rotor 1030 to the wheel hub 1020 and inhibit turning of the disc brake rotor 1030 relative to the wheel hub 1020 (e.g., during a braking operation). In contrast with the assembly 10 described above, the partial keyways 1111, 1113 of the outboard and inboard bosses 1082, 1086 of the wheel hub 1020 are configured to extend around less than an entire circumference of each of the spring pins 1050. For example, as shown in FIG. 13, the bosses 1082, 1086 protrude radially outward from a wall 1025 of the wheel hub 1020. The partial keyways 1111, 1113 have a halfpipe-like shape with semi-circular slots or openings 1084, 1088 for receiving a portion of the outer surface of the spring pins 1050. Although illustrated as configured to extend around approximately 180 degrees of the circumference of the spring pins 1050, in other forms, the partial keyways 1111, 1113 of the outboard and inboard bosses 1082, 1086 may be configured to cover less or more of the circumference of the spring pins 1050.

As shown in FIG. 14, the bosses 1105 of the disc brake rotor 1030 are substantially similar to the bosses 105 described above. However, as described above, the partial keyways 1111, 1113 of the outboard and inboard bosses 1082, 1086 of the wheel hub 1020 extend around less than an entire circumference of the outer surface of the spring pins 1050 while the partial keyways 1115 extend around the entire circumference. Additionally, due to the differing construction of the outboard and inboard bosses 1082, 1086, the inboard surface portion 1087 of the inboard boss 1086 does not extend far enough radially outward such that it is able to abut the outboard surface 1061 of the retaining ring 1060, so the retaining ring 1060 does not abut a surface of the inboard boss 1086. Rather, the retaining ring 1060 is held in place by tabs 1093 of the rotor 1030 and the spring pins 1050. An additional structure (e.g., a continuous groove in the rotor) may be included to further secure the installed retaining ring 1060.

Figure 15:
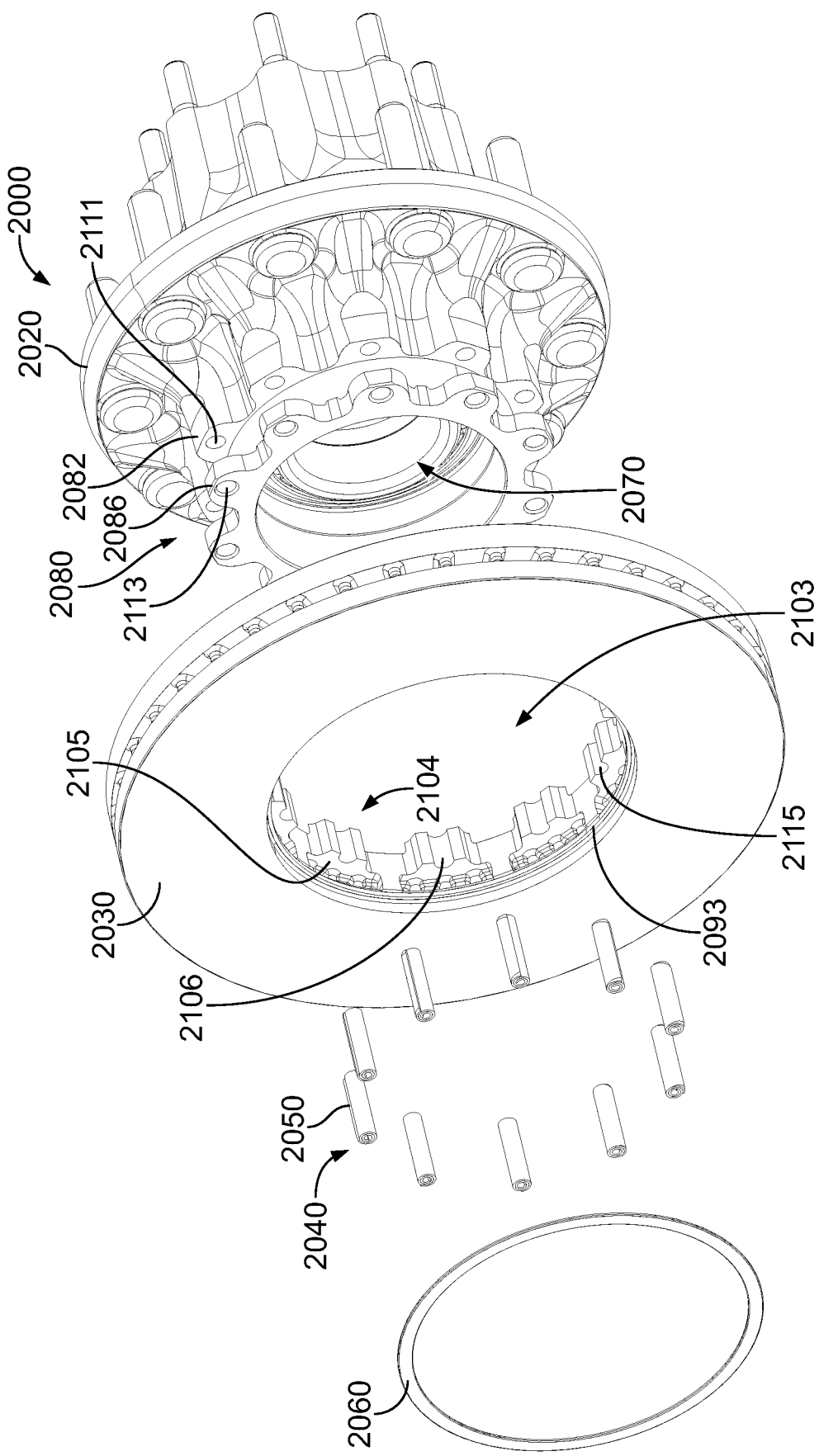
FIG. 15 is an exploded view of another disc brake assembly including a disc brake rotor having bosses with partial keyways to receive spring pins, the bosses configured to extend around less than an entire circumference of the spring pins.
Figure 16:
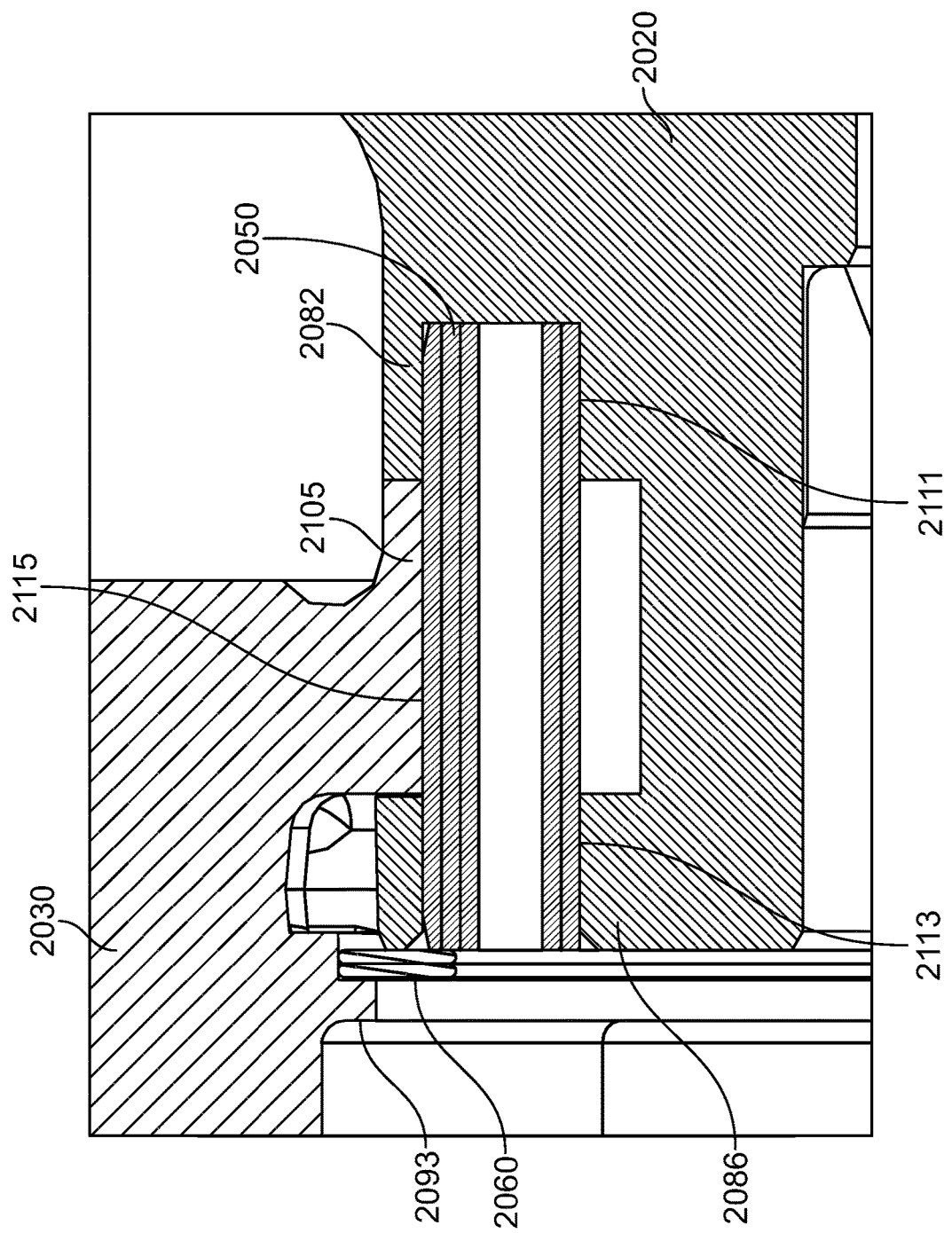
FIG. 16 is a cross-sectional view of a portion of the assembled disc brake rotor assembly of FIG. 15 showing a spring pin received in partial keyways of the disc brake rotor and wheel hub.

Referring now to FIGS. 15 and 16, another disc brake assembly 2000 is provided that is substantially similar to the disc brake assembly 10 such that any differences will be described hereinafter. Similar to assembly 10, the disc brake assembly 2000 includes a wheel hub 2020 and a disc brake rotor 2030 configured to be secured to the wheel hub 2020 using one or more fasteners 2040 such as spring pins 2050. The disc brake rotor 2030 and the wheel hub 2020 have male and female mounting portions 2104, 2080 including bosses 2105, 2082, 2086 with partial keyways 2115, 2111, 2113 that are configured to be aligned to form completed keyways such that spring pins 2050 may be received therein to secure the disc brake rotor 2030 to the wheel hub 2020 and inhibit turning of the rotor 2030 relative to the wheel hub 2020 (e.g., during a braking operation). In contrast with the assembly 10 described above, the bosses 2105 of the disc brake rotor 2030 extend around less than an entire circumference of each of the spring pins 2050. For example, as shown in FIG. 15, the bosses 2105 protrude radially inward into the central opening 2103 of the disc brake rotor 2030. The partial keyways 2115 have a halfpipe-like shape with semi-circular slots or openings 2106 for receiving a portion of the spring pins 2050. Although illustrated as configured to extend around approximately 180 degrees of the circumference of the spring pins 2050, in other forms, the bosses 2105 may be configured to cover less or more of the circumference of the spring pins 2050.

Further, in contrast with the bosses 105, the bosses 2105 may not include a corresponding rotor pilot surface configured to engage with and slide along a hub pilot surface of the wheel hub 2020.

As shown in FIG. 16, the female mounting portions 2080 of the wheel hub 2020 include outboard and inboard bosses 2082, 2086 that are substantially similar to the bosses 82, 86 described above. However, the boss 2105 of the disc brake rotor 2030 extends around less than an entire circumference of the outer surface of the spring pins 2050 while the bosses 2082, 2086 of the wheel hub 2020 extend around the entire circumference.

This application describes examples that are meant to be illustrative and not limiting. The various described examples may be modified and/or combined with one another without departing from the scope described herein. For example, in still other embodiments of the assemblies 10, 1000, 2000 described herein, other forms of fasteners such as solid or slotted pins may be additionally or alternatively used for coupling the disc brake rotor to the wheel hub. Further, features of one embodiment may be combined with features of other embodiments to provide still further embodiments as appropriate.

Uses of singular terms such as "a," and "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments, it will be appreciated that numerous changes and modifications will occur to those skilled in the art, and it is intended for the present disclosure to cover all those changes and modifications which fall within the scope of the appended claims.

What is claimed is:
1. A disc brake rotor assembly comprising:
 a disc brake rotor;
 a wheel hub;
 a plurality of pairs of partial keyways of one of the disc brake rotor and the wheel hub;
 intermediate partial keyways of the other of the disc brake rotor and the wheel hub configured to fit intermediate the pairs of partial keyways to form keyways;
 a plurality of fasteners configured to be received in the keyways to secure the disc brake rotor and the wheel hub together;

wherein the fasteners each have a circumference; and
wherein at least one of the pairs of partial keyways and the intermediate partial keyways extend around the entire circumference of the fasteners.

2. The disc brake rotor assembly of claim 1 wherein the fasteners include spring pins.

3. The disc brake rotor assembly of claim 1 wherein the fasteners have a length; and
wherein the pairs of partial keyways and the intermediate partial keyways are configured to apply shear loads to the fasteners in two planes normal to the fastener length during a braking operation.

4. The disc brake rotor assembly of claim 1 wherein the fasteners have a length;
wherein each of the pairs of partial keyways include a first partial keyway and a third partial keyway; and
wherein the first partial keyways, third partial keyways, and intermediate partial keyways each have a length that is less than the length of the fasteners.

5. The disc brake rotor assembly of claim 1 wherein the disc brake rotor and the wheel hub are rotatable around a central axis and the keyways are radially outward of the central axis; and
wherein the keyways have central axes extending transversely to a radial direction.

6. The disc brake rotor assembly of claim 1 wherein the disc brake rotor and the wheel hub are rotatable around a central axis and the keyways have central axes parallel to the central axis.

7. The disc brake rotor assembly of claim 1
wherein at least one of the pairs of partial keyways and the intermediate partial keyways extend around less than an entire circumference of the fasteners.

8. The disc brake rotor assembly of claim 1 wherein the pairs of partial keyways include through bores and blind bores.

9. The disc brake rotor assembly of claim 1 wherein the one of the disc brake rotor and the wheel hub comprises a plurality of pairs of bosses including the pairs of partial keyways and the other of the disc brake rotor and the wheel hub comprises a plurality of bosses including the intermediate partial keyways.

10. The disc brake rotor assembly of claim 9 wherein the pairs of bosses include first bosses and third bosses; and
wherein the one of the disc brake rotor and the wheel hub comprises gaps intermediate the first and third bosses sized to receive the bosses of the other of the disc brake rotor and the wheel hub.

11. The disc brake rotor assembly of claim 1 wherein the wheel hub includes the pairs of partial keyways; and
wherein the disc brake rotor includes the intermediate partial keyways.

12. The disc brake rotor assembly of claim 1 further comprising a retainer to be connected to at least one of the disc brake rotor and the wheel hub to maintain the fasteners in the keyways.

13. The disc brake rotor assembly of claim 1 wherein the wheel hub includes a wheel hub body including a flange portion to receive a wheel;
wherein the wheel hub body includes the pairs of partial keyways; and
wherein the wheel hub body has a unitary, one-piece construction.

14. The disc brake rotor assembly of claim 1 wherein the pairs of partial keyways and the intermediate partial keyways each extend around the entire circumference of the fastener.

15. A disc brake rotor assembly configured to rotate about a central axis, the disc brake rotor assembly comprising:
a wheel hub having wheel hub bosses;
a disc brake rotor having rotor bosses, the disc brake rotor having a center opening to receive the wheel hub;
the disc brake rotor bosses and the wheel hub bosses having a clearance configuration wherein the bosses permit relative axial movement and assembly of the disc brake rotor and the wheel hub;
the disc brake rotor bosses and the wheel hub bosses having an interference configuration wherein the disc brake rotor bosses and wheel hub bosses limit relative axial movement of the disc brake rotor and the wheel hub;
wherein the assembled disc brake rotor and the wheel hub are configured to be turned relative to one another to shift the rotor bosses and the wheel hub bosses from the clearance configuration to the interference configuration; and
a plurality of fasteners to secure the disc brake rotor and the wheel hub together with the rotor bosses and the wheel hub bosses in the interference configuration.

16. The disc brake rotor assembly of claim 15 wherein the rotor bosses include partial keyways and the wheel hub bosses include partial keyways; and
wherein the partial keyways of the rotor bosses and the partial keyways of the wheel hub bosses form keyways to receive the fasteners with the rotor bosses and the wheel hub bosses in the interference configuration.

17. The disc brake rotor assembly of claim 16 wherein the fasteners include circumferences; and
wherein at least one of the partial keyways of the rotor bosses and the partial keyways of the wheel hub bosses extend around an entire circumference of at least one of the fasteners.

18. The disc brake rotor assembly of claim 16 wherein the fasteners include circumferences; and
wherein at least one of the partial keyways of the rotor bosses and the partial keyways of the wheel hub bosses extend around less than an entire circumference of at least one of the fasteners.

19. The disc brake rotor assembly of claim 15 wherein the wheel hub includes a pilot adjacent the wheel hub bosses and gaps associated with the wheel hub bosses configured to permit the rotor bosses to be advanced axially through the gaps and onto the pilot with the rotor bosses and the wheel hub bosses in the clearance configuration.

20. The disc brake rotor assembly of claim 19 wherein the rotor bosses include rotor pilots configured to engage the wheel hub pilot and facilitate relative turning of the disc brake rotor and the wheel hub with the rotor pilots engaging the wheel hub pilot.

21. The disc brake rotor assembly of claim 15 wherein the rotor bosses and the wheel hub bosses are rotationally misaligned with the rotor bosses and the wheel hub bosses in the clearance configuration; and
wherein the rotor bosses and the wheel hub bosses are rotationally aligned with the rotor bosses and the wheel hub bosses in the clearance configuration.

22. The disc brake rotor assembly of claim 15 wherein the rotor bosses and the wheel hub bosses do not axially overlap with the rotor bosses and the wheel hub bosses in the clearance configuration; and
wherein the rotor bosses and the wheel hub bosses axially overlap with the rotor bosses and the wheel hub bosses in the interference configuration.

23. The disc brake rotor assembly of claim 15 wherein the wheel hub bosses include a first plurality of wheel hub bosses and a second plurality of wheel hub bosses; and wherein the first plurality of wheel hub bosses are spaced apart about the wheel hub by gaps sized to permit the rotor bosses to be advanced therethrough with the rotor bosses and the wheel hub bosses in the clearance configuration.

24. The disc brake rotor assembly of claim 15 wherein the wheel hub bosses include a first plurality of wheel hub bosses and a second plurality of wheel hub bosses; and wherein the wheel hub includes a stop surface portion configured to engage the disc brake rotor and limit axial movement of the disc brake rotor in a first direction beyond an installation position on the wheel hub; and wherein the first plurality of wheel hub bosses include stop surface portions axially spaced from the stop surface portion and configured to engage the rotor bosses and limit axial movement of the disc brake rotor in a second direction opposite the first direction with the rotor bosses and the wheel hub bosses in the interference configuration.

25. The disc brake rotor assembly of claim 15 wherein the rotor bosses and the wheel hub bosses comprise:

a plurality of pairs of bosses; and
intermediate bosses configured to fit intermediate the pairs of bosses with the rotor bosses and the wheel hub bosses in the interference configuration.

26. The disc brake rotor assembly of claim 15 wherein the center opening of the disc brake rotor has a first center and the wheel hub has a central through opening with a second center; and wherein the first and second centers of the disc brake rotor and the wheel hub are intersected by the central axis with the rotor bosses and the wheel hub bosses in the clearance configuration and the interference configuration.

27. The disc brake rotor of claim 15 wherein the fasteners include spring pins.

28. A disc brake rotor assembly comprising:
a disc brake rotor;
a wheel hub;
a plurality of spring pins to connect the disc brake rotor and the wheel hub, each spring pin having opposite end portions and an intermediate portion between the end portions;
one of the disc brake rotor and the wheel hub having female mounting portions to engage the end portions of the spring pins, the female mounting portions including pairs of partial keyways configured to receive the end portions of the spring pins;
the other of the disc brake rotor and the wheel hub having male mounting portions to cooperate with the female mounting portions and engage the intermediate portions of the spring pins, the male mounting portions each including a partial keyway configured to fit intermediate one of the pairs of partial keyways of the female mounting portions and form a keyway to receive one of the spring pins with the one pair of partial keyways receiving the end portions of the one spring pin and the partial keyway of the male mounting portion receiving the intermediate portion of the one spring pin; and
the spring pins configured to transfer torque from the disc brake rotor to the wheel hub during a braking operation with the female mounting portions of the one of the disc brake rotor and the wheel hub engaging the end portions of the spring pins and the male mounting portions of the other of the disc brake rotor and the wheel hub engaging the intermediate portions of the spring pins.

29. The disc brake rotor of claim 28 wherein each of the spring pins has a circumference; and wherein at least one of the pairs of partial keyways of the female mounting portions and the partial keyways of the male mounting portions extends around less than the entirety of the circumference of the spring pins.

30. The disc brake rotor of claim 28 wherein the female mounting portions include pairs of bosses separated by associated gaps; and wherein the male mounting portions include bosses sized to fit in the gaps.

31. The disc brake rotor of claim 28 wherein the disc brake rotor and the wheel hub are rotatable about a central longitudinal axis; and wherein the male mounting portions and female mounting portions include laterally extending surface portions configured to engage and inhibit relative axial movement of the male and female mounting portions.

32. The disc brake rotor of claim 28 wherein the female mounting portions of the one of the disc brake rotor and the wheel hub include at least one first pilot surface and the male mounting portions of the other of the disc brake rotor and the wheel hub include at least one second pilot surface to engage the at least one first pilot surface and facilitate relative turning of the disc brake rotor and the wheel hub.

33. The disc brake rotor of claim 28 wherein the disc brake rotor and the wheel hub are rotatable about a central axis; and wherein the spring pins are elongate and have lengths oriented to extend along the central axis.

34. The disc brake rotor of claim 28 further comprising a retainer to be connected to at least one of the disc brake rotor and the wheel hub to resist back-out of the fasteners.

35. The disc brake rotor assembly of claim 28 wherein the spring pins are each a coiled strip of metal.

36. A method of assembling a disc brake rotor assembly comprising a disc brake rotor and a wheel hub, wherein one of the disc brake rotor and the wheel hub includes a plurality of first partial keyways and a plurality of third partial keyways and the other of the disc brake rotor and the wheel hub includes a plurality of second partial keyways, the method comprising:

positioning the second partial keyways intermediate the first partial keyways and the third partial keyways to form keyways; and
advancing leading end portions of fasteners through the first partial keyways, through the second partial keyways, and into the third partial keyways so that the fasteners extend in the keyways and connect the disc brake rotor and the wheel hub;
wherein the fasteners each include a circumference and at least one of the first partial keyways, second partial keyways, and third partial keyways extends around the entire circumference of the fasteners.

37. The method of claim 36 wherein positioning the second partial keyways intermediate the first partial keyways and the third partial keyways includes aligning centers of the first, second, and third partial keyways.

38. The method of claim 36 wherein the fasteners include spring pins.

39. The method of claim 36 wherein positioning the second partial keyways comprises:

advancing the disc brake rotor relative to the wheel hub to locate the disc brake rotor at an installation position along the wheel hub; and turning the disc brake rotor and wheel hub relative to one another with the disc brake rotor at the installation position along the wheel hub.

40. The method of claim 36 wherein the disc brake rotor and the wheel hub include each include bosses and gaps between the bosses; and wherein positioning the second partial keyways comprises advancing the bosses through the gaps and turning the disc brake rotor and the wheel hub relative to one another to align the first, second, and third partial keyways.

41. The method of claim 36 wherein the one of the disc brake rotor and the wheel hub comprises a plurality of first bosses including the first partial keyways and a plurality of third bosses including the third partial keyways and the other of the disc brake rotor and the wheel hub comprises a plurality of second bosses including the second partial keyways; and wherein positioning the second partial keyway comprises positioning the second bosses intermediate the first bosses and the third bosses.

42. The method of claim 36 further comprising connecting a retainer to at least one of the disc brake rotor and the wheel hub to inhibit back-out of the fasteners from the keyways.

43. The method of claim 36 wherein at least one of the first partial keyways, second partial keyways, and third partial keyways extends around less than the entire circumference of the fasteners.

44. A method of assembling a disc brake rotor assembly comprising a disc brake rotor and a wheel hub, wherein one of the disc brake rotor and the wheel hub includes a plurality of first partial keyways and a plurality of third partial keyways and the other of the disc brake rotor and the wheel hub includes a plurality of second partial keyways, the method comprising:

positioning the second partial keyways intermediate the first partial keyways and the third partial keyways to form keyways; and advancing leading end portions of fasteners through the first partial keyways, through the second partial keyways, and into the third partial keyways so that the fasteners extend in the keyways and connect the disc brake rotor and the wheel hub;

wherein the disc brake rotor and the wheel hub include bosses; and wherein positioning the second partial keyways comprises:

orienting the bosses of the disc brake rotor and the wheel hub in a clearance configuration;

advancing the disc brake rotor relative to the wheel hub in a first direction with the bosses in the clearance configuration to position the disc brake rotor on the wheel hub; and turning the disc brake rotor and the wheel hub relative to one another to shift the bosses to an interference configuration wherein the bosses engage to limit shifting of the disc brake rotor relative to the wheel hub in a second direction opposite the first direction.

45. A disc brake rotor assembly comprising:

a disc brake rotor;

a wheel hub;

a plurality of pairs of partial keyways of one of the disc brake rotor and the wheel hub;

intermediate partial keyways of the other of the disc brake rotor and the wheel hub configured to fit intermediate the pairs of partial keyways to form keyways; and a plurality of fasteners configured to be received in the keyways to secure the disc brake rotor and the wheel hub together;

wherein the disc brake rotor and the wheel hub are rotatable around a central axis;

wherein the disc brake rotor and the wheel hub include bosses having a clearance configuration wherein the bosses permit the disc brake rotor and the wheel hub to be shifted axially relative to one another to locate the disc brake rotor at an installation position along the wheel hub and an interference configuration wherein the bosses limit relative axial shifting of the disc brake rotor and the wheel hub; and wherein the disc brake rotor and the wheel hub are rotatable relative to one another with the disc brake rotor at the installation position to shift the bosses from the clearance configuration to the interference configuration.

46. A disc brake rotor assembly comprising:

a disc brake rotor;

a wheel hub;

a plurality of spring pins to connect the disc brake rotor and the wheel hub, each spring pin having opposite end portions and an intermediate portion between the end portions;

one of the disc brake rotor and the wheel hub having a pair of female mounting portions to engage the end portions of the spring pins;

the other of the disc brake rotor and the wheel hub having male mounting portions to cooperate with the female mounting portions and engage the intermediate portions of the spring pins;

the spring pins configured to transfer torque from the disc brake rotor to the wheel hub during a braking operation with the pair of female mounting portions of the one of the disc brake rotor and the wheel hub engaging the end portions of the spring pins and the male mounting portions of the other of the disc brake rotor and the wheel hub engaging the intermediate portions of the spring pins;

wherein the pair of female mounting portions include partial keyways to receive the end portions of the spring pins and the male mounting portions include partial keyways to receive the intermediate portions of the spring pins;

wherein each of the spring pins has a circumference; and wherein at least one of the partial keyways of the female mounting portions and the partial keyways of the male mounting portions extends around the entirety of the circumference of the spring pins.

* * * * *